United States Patent
Kaczmarczyk

(10) Patent No.: US 6,961,334 B1
(45) Date of Patent: Nov. 1, 2005

(54) INTELLIGENCE ENGINE

(75) Inventor: Casimer M. Kaczmarczyk, Plano, TX (US)

(73) Assignee: Sonus Networks, Inc., Chelmsford, MA (US)

( * ) Notice: Subject to any disclaimer, the term of this patent is extended or adjusted under 35 U.S.C. 154(b) by 858 days.

(21) Appl. No.: 09/821,507

(22) Filed: Mar. 29, 2001

(51) Int. Cl.[7] .............................................. H04L 12/66
(52) U.S. Cl. ................. 370/354; 379/201.02
(58) Field of Search ............... 370/230, 270, 370/351–356, 400, 401, 402, 410, 411, 422, 370/465–469; 379/201.02, 201.03, 207.02, 379/218.01, 219, 220.01, 221.03, 221.06, 379/221.08

(56) References Cited

U.S. PATENT DOCUMENTS

| | | | |
|---|---|---|---|
| 6,385,646 B1 * | 5/2002 | Brown et al. | 709/217 |
| 6,393,481 B1 * | 5/2002 | Deo et al. | 709/224 |
| 6,704,303 B1 * | 3/2004 | Bowman-Amuah | 370/352 |

\* cited by examiner

Primary Examiner—Wellington Chin
Assistant Examiner—John Shew
(74) Attorney, Agent, or Firm—Proskauer Rose, LLP

(57) ABSTRACT

One aspect of the invention is an intelligence engine. The intelligence engine includes a distributor layer operable to communicate with at least one call agent in a telecommunications network. The call agent may receive state-driven information associated with a call between an originator and a termination point. The intelligence engine also includes a telephony management layer. The telephony management layer is operable to receive a plurality of stateless requests from the distributor layer, access a database entry associated with the requests, spawn at least one request to obtain information associated with the originator and the termination point if necessary to route the call, and send the information to the call agent to route the call. In a particular embodiment, the intelligence engine further includes a facility management command and control layer. The facility management command and control layer is operable to receive an indicator signal associated with the call from the network. The call is controlled by the call agent. The facility management command and control layer is also operable to access a database entry associated with the call agent in response to the indicator signal and to reassign control of the call from the call agent to a second call agent.

31 Claims, 29 Drawing Sheets

INTELLIGENCE ENGINE

TECHNICAL FIELD OF THE INVENTION

This invention is related in general to the field of telecommunications systems and methods. More particularly, the invention is related to an intelligence engine.

BACKGROUND OF THE INVENTION

Inter-personal and inter-organizational communication has increased in complexity. For example, the public switched telephone network (PSTN) currently includes separate networks to accommodate different traffic types. Command and control functionality of the PSTN is built around a connection-oriented class structure. Call processing is completed by a complex array of switches, processors, and control networks, such as the Signaling System 7 (SS7). The PSTN is built on a class structure of specialized devices that perform single-purpose functions. For example, Class 5 switches provide local access and call waiting; Class 4 switches provide long distance, toll calls and billing. Connectivity is also connection-oriented, where two devices must establish a discrete, deterministic connection or voice channel before communication can begin. The voice channel also must remain in place for the duration of the call. The PSTN is also a hierarchical one-to-many network that may result in traffic congestion, or blocking, thus creating the need for centralized control to proactively re-route the traffic. New service and feature development on this complex network is time-consuming and difficult, requiring a great deal of development time and resources.

In contrast to the PSTN, an Internet Protocol (IP) network, such as the Internet, uses a packet-based architecture, which is generally more economical than circuit switched networks (such as SS7). In an IP network, every packet of information carries all the necessary control information needed to connect the originating device to its destination using only the resources needed. This allows for uncomplicated (less) throttle points, geographic expansion, and transport integration. An Internet Protocol (IP) network is typically used to handle the large amounts of time-sensitive data such as telephony data and/or video or video-on-demand data.

In addition, a variety of wireless networks has been developed, each with its own protocol. As these developments have occurred, users increasingly desire voice as well as IP data to be communicated over wireless networks, such as time division multiplex access (TDMA), call division multiplex access (CDMA), advanced mobile phone service (AMPS), and wideband and proposed third generation (3G) wireless systems W-CDMA, W-TDMA, and others, which provide for IP data as well as voice transfer.

An H.323 protocol environment or Session Initiation Protocol (SIP) provides a way for transmitting voice communications within IP networks. In general, H.323 define a set of call control, channel set-up, and code C specifications for transmitting real-time voice and video over networks that do not offer guaranteed service or quality of service—such as packet networks, and in particular, the Internet, local area networks, wide area networks, and Intranets. SIP is a session-layered control (signaling) protocol for creating, modifying and terminating session with one or more participants.

Communications of telephone calls between the PSTN (which uses SS7 protocol), wireless and IP networks (which additionally use H.323 protocol to transfer voice over the IP) have traditionally used complicated signaling gateways to perform conversions between the PSTN signaling functions and the Net Protocol Network signaling functions. One function that is performed in facilitating communication between various types of networks is determining through which route a telephone call will take place in the network in which the call will terminate. For the PSTN, the route a telephone call takes place is comprised of a plurality of trunks. A trunk (not specifically shown) is a communication line between two switching systems, such as between a central office and a private branch exchange (PBX).

Routing time-sensitive data such as telephone calls whether between networks of the same type or between different networks, typically requires complex signaling algorithms to be utilized.

Furthermore, the number of resources required to maintain such a network and to route these calls is burdensome. For example, in order to complete a call, the system must "dip down" into both a calling party's and destination party's Automatic Number Identification (ANI) database. This process is performed to insure that subscriber information such as caller ID, call blocking, and others, are correctly obtained for each of the parties to properly insure completion of the call. Such processing is inefficient because, in part, many circuits are tied up during this process. This "dip down" process reaches below the physical layer to perform authenticating and routing functions. For example, a single call session may require numerous (on the order of hundreds) traversals to and accesses to one or more databases. Such processing also limits the scalability of systems. These numerous database accesses are required, for examine, when mechanically based circuits translate each digit as it is dialed in. In some cases, this process may involve local, regional, and/or national tandem switching elements in the transit network, each of which has an ANI table. Each of these ANI databases are typically maintained by separate management information systems (MIS). Processing wireless calls only increases the complexity of such systems. For example, routing, authentication and verification, and fraud detection require information such as, but not limited to, home location register (HLR) and/or visitor location register (VLR), in addition to ANI information to complete a call. Additional information is also required with mobile devices such as cellular phones or radios, which typically utilize a device identifier such as a mobile identification number (MIN), an electronic serial number (ESN), or an international mobile subscriber identity (IMSI). These identifiers are required to identify both a device and subscriber to a network for purposes of authentication, tracking, and billing. Moreover, fraud detection typically requires information such as correlation tables to be used in conjunction with the IMSI to verify subscriber information and/or services that are provided to an origination or termination party. Thus, this process of obtaining information for each call may be extremely complex and consume a great deal of time and resources while the information is being obtained. Moreover, congestion, delay, or malfunction within an IP network is typically handled by simply re-sending data packets to a terminating party. Such retransmissions decrease network efficiency by tying up circuits that may be inoperative and provide no network self-awareness.

SUMMARY OF THE INVENTION

From the foregoing, it may be appreciated that a need has arisen for an intelligence engine. In accordance with teachings of the present invention, an intelligence engine is provided that substantially reduces or eliminates disadvantages and problems of conventional systems.

One aspect of the invention is an intelligence engine. The intelligence engine includes a distributor layer operable to communicate with at least one call agent in a telecommunications network. The call agent may receive state-driven information associated with a call between an originator and a termination point. The intelligence engine also includes a telephony management layer. The telephony management layer is operable to receive a plurality of stateless requests from the distributor layer, access a database entry associated with the requests, spawn at least one request to obtain information associated with the originator and the termination point if necessary to route the call, and send the information to the call agent to route the call. In a particular embodiment, the intelligence engine further includes a facility management command and control layer. The facility management command and control layer is operable to receive an indicator signal associated with the call from the network. The call is controlled by the call agent. The facility management command and control layer is also operable to access a database entry associated with the call agent in response to the indicator signal and to reassign control of the call from the call agent to a second call agent.

The invention provides several technical advantages. Various embodiments of the invention may have none, some, or all of these advantages. For example, the invention may provide a stateless control layer that easily interfaces with state-driven call and/or IP data processing network functions. Such an advantage may reduce delays in processing that would otherwise be required with circuit or state based call processing systems. Yet another technical advantage of the invention is that the invention may be used with a variety of data traffic. For example, the invention may be used with call processing networks such as SS7 or Session Initiation Protocol (SIP), wireless call processing networks including GSM, CDMA, TDMA, wireless 3G, and AMPS, and IP data using a variety of protocols such as H.323. For example, it may be advantageous to use the invention for time-sensitive data communications that typically require high bandwidth and/or minimization of interruptions during data transfer, such as video-on-demand, call conferencing, and image processing.

Another technical advantage of the invention is that the invention may provide a centralized repository for a number of databases such as ANI databases. Such an advantage may reduce the redundancy required to maintain such information. In addition, such an advantage may also improve the ease of maintaining and/or updating the databases with new information, such as a new area code or service that may be offered.

The invention may also provide the technical advantage of reducing the number of ports in a transit network that may be required to complete a call. For example, rather than "dipping down" through a variety of ports in a transit network to obtain information required to complete a call, the invention may intelligently spawn processes to search through a number of available databases, whether maintained in a centralized location or distributed geographically. Such an advantage may reduce the time needed to complete a call, as well as reducing the number of ports that are required to be reserved or allocated to the call. Control and intelligence layers may thus be collapsed into a single packet-based stream.

Another technical advantage of the invention is that the invention may provide the ability to perform facility management command and control. For example, should a media gateway controller for one region fail or otherwise malfunction, the invention automatically reroutes traffic to another media gateway controller without disrupting or infecting other networks. For example, the invention may provide in conjunction with such malfunction automatic updating databases such as dispatch circuit, trunk, and group tables.

Furthermore, embodiments of the invention enable technology vendors to interoperate with other elements in media-controlled or service layers, without having to maintain currency with other vendors' technology. Embodiments of the invention also allow call routing to be effected through a plurality of nested tables, which are easily modifiable to modify a customer's services. For example, allowing a particular person to place a 1-900 call is simply effected by changing an entry in a table. Furthermore, the invention allows scalability and flexibility by allowing a subscriber to add tables as needed and add to the tables as needed. Therefore, very complex sets of services and privileges may be easily provided not only for a group of subscribers but also can be easily provided for a single subscriber. Other technical advantages are readily apparent to one skilled in the art from the following figures, descriptions and claims.

BRIEF DESCRIPTION OF THE DRAWINGS

For a more complete understanding of the present invention and the advantages thereof, reference is now made to the following descriptions taken in conjunction with the accompanying drawings, wherein like reference numerals represent like parts, and in which.

DETAILED DESCRIPTION OF THE INVENTION

Example embodiments of the invention are best understood by referring to FIGS. 1 through 19 of the drawings like numerals being used for like and corresponding parts of the various drawings.

Figure 1:
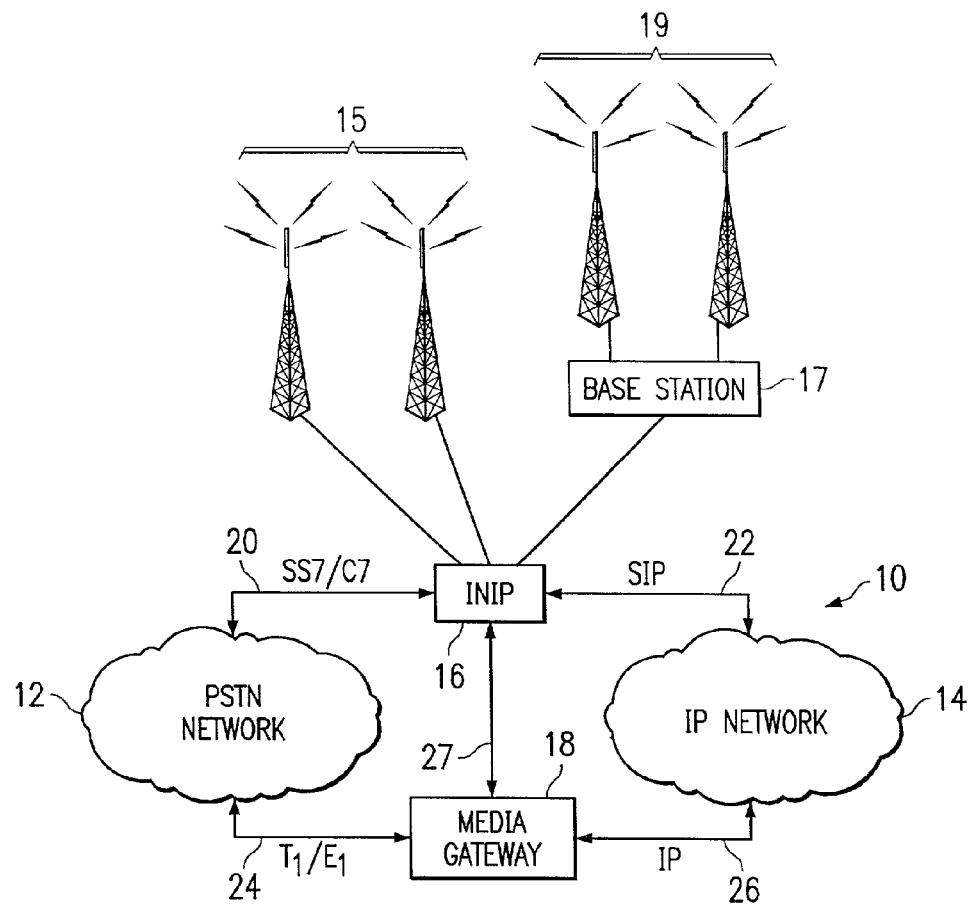
FIG. 1 is a block diagram of a communications network utilizing the teachings of the present invention, including a call routing and signaling system for routing a call using an IP network of the communications network.

FIG. 1 is a block diagram of a communications network 10 utilizing the teachings of the present invention. Communication network 10 includes a public switched telephone network (PSTN) 12 and an Internet Protocol network (IP) 14. A call routing and signaling system 16 and a media gateway 18 provide connectivity between PSTN 12 and IP network 14. Call routing and signaling system 16 also provides connectivity to wireless systems such as base station radio systems 15, and base station or radio gateway 17, which is operable to connect to wireless systems 19. Base station radio systems 15 may include, but are not limited to, AMPS, GSM, CDMA, and TDMA technologies, and base station or radio gateway 17 may include, but is not limited to, GSM, W-CDMA, W-TDMA, and GPRS technology, which may be then be coupled to third generation (3G)/GPRS base station radios. Wireless systems may include the use of wireless devices such as mobile phones, personal digital assistance (PDAs), and others.

PSTN 12 is one example of a network that utilizes Signaling System 7 (SS7) signaling protocol to control call processing. In this embodiment, public switched telephone 12 represents a worldwide voice telephone network, which in the U.S. was formerly known as the Bell System Network or the ATT Long Distance Network; however, PSTN 12 represents any network having a first type of communication protocol, for example SS7, that is different from that of another network with which it communicates, such as IP. Public switched telephone number 12 uses SS7 protocol to control calls within a network and outside the network, as shown by arrow 20.

IP network 14 is a network that utilizes IP for communications, and in particular, in this example, Session Initiation Protocol (SIP); however, IP network 14 represents any network that utilizes a second type of communication protocol, for example, IP, that is different from that of another network with which it communicates, such as SS7. SIP supports five facets of establishing and terminating multi communications: user location (determination of the end system to be used for communication); user capabilities (determination of the media and media parameters to be used); user availability (determination of the willingness of the calling party to engage); call setup ("ringing," establishment of call parameters of both called and calling party); and call handling (including transfer and termination of calls). In this embodiment, IP network 14 uses Session Initiation Protocol, or SIP, which is a session-layered control (signaling) protocol for creating, modifying and terminating sessions with one or more participants, both within IP network 14 and outside IP Network 14, as illustrated by reference in row 22.

Call routing and signaling system 16 is implemented in this example by a combination of software and hardware known as Intelligent IP (INIP) and is described in greater detail below in conjunction with FIG. 2A. Call routing and signaling system 16 provides SS7 protocol to IP interface and coordinates the SS7 view of IP elements and the IP view of SS7 elements. Call routing and signaling system 16 performs functions analogous to the service switching point, or signal switching point (SSP) traditionally used within an SS7 network.

A media gateway 18 terminates switched telephone lines in public switch telephone network 12 and packetized media streams for IP transport over IP network 14. Media gateway 18 terminates public switched telephone lines, which may be T1 lines, E1 lines or other suitable media, as denoted by reference numeral 24. On the IP network 14 side of media gateway 18, are lines 26 which may also be T1, E1 or other suitable lines, but carry IP transmissions.

Media gateway 18 and call routing and signaling system 16 utilize a Media Gateway Control Protocol (MGCP), which is a combination of the Internet Protocol Device Control (IPDC) specification and the simple Gateway Control Protocol (SGCP), which enable external control and management of media gateway devices by software programs known as call agents or media gateway controls to communicate over line 27.

Communication network 10 operates as follows: A service request, or call, originates at PSTN 12. Signaling associated with the call, which in this embodiment is according to the SS7 protocol, travels to signaling gateway 16, as denoted by reference numeral 20. Call routing and signaling system 16 receives the SS7 signaling, converts the signaling into an internal format, processes the calls, and generates SIP signaling, as denoted by reference numeral 22, for transmission to IP network 14. The content of the call travel over public switch telephone lines 24 through media gateway 18 and over line 26, now according to IP for termination within Internet Protocol network 14. Calls originating from IP network 14 are handled in a converse manner. Wireless calls may also be received by call routing and signaling system 16, which may convert the signaling into an internal format, process the calls, and generate signaling for transmission to either IP network 14 or PSTN 12.

Figure 2A:
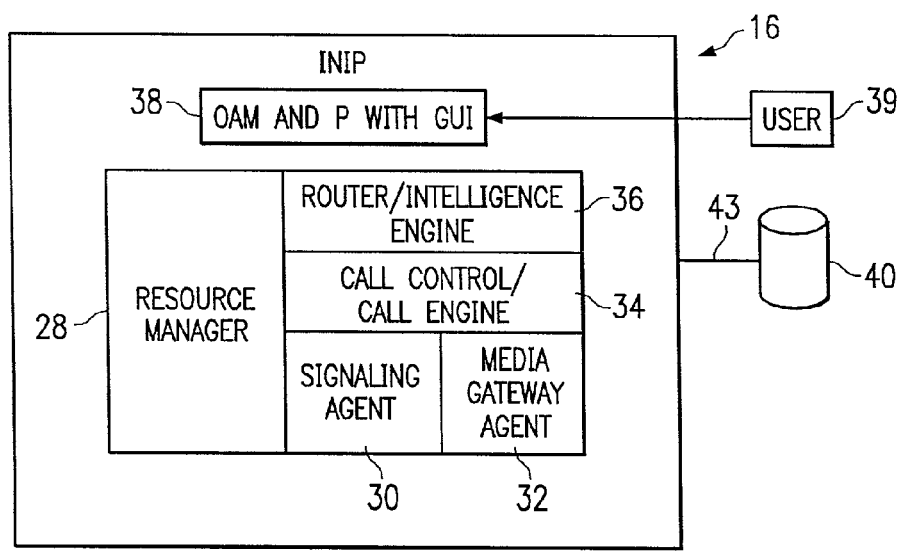
FIG. 2A is a block diagram of a call routing and signaling system of FIG. 1, which includes a call control engine and an intelligence engine.

FIG. 2A is a block diagram of call routing and signaling system 16 comprises a plurality of hardware and software forming various functional units. call routing and signaling system 16 includes a resource manager 28, a signaling agent 30, a media gateway agent 32, a call control engine 34, a router/intelligence engine ("intelligence engine") 36, and OAM & P GUI 38.

Resource manager 28 determines and stores the trunks associated with both PSTN 12 and IP network 14 that are in use; therefore, resource manager 28 knows which trunks are out of service.

Signaling agent 30 translates messages received from either public switch network 12 or IP network 14 or call control/engine 34, and provides signaling necessary to route calls to either public switch network 12 or IP network 14 based on the route determined by call control engine 34 and intelligence engine 36.

Call control engine 34 performs a number of functions, which are described in detail below. For example, call control engine 34 validates that a calling party is a valid caller, determines what services are available for the caller, determines what to do with the call, and once it figures out what to do with the call, packages the call and sends it to intelligence engine 36. Call control engine may communicate with external databases 40 over communication line 43 to process calls. Call control engine is described in greater detail below in conjunction with FIGS. 2B through 15.

Intelligence engine 36 performs functions related to call control. Intelligence engine 36 determines what route the call will take, and in doing so, also communicates with database 40 over line 43. Intelligence engine 36 is described in greater detail below in conjunction with FIGS. 16–19.

OAM & P GUI 38 provide user interaction through a graphical user interface to allow a user 39 to configure network controller 16 and provision tables in database 40. Additional details of database 40 are described in conjunction with FIG. 2B.

Figure 2B:
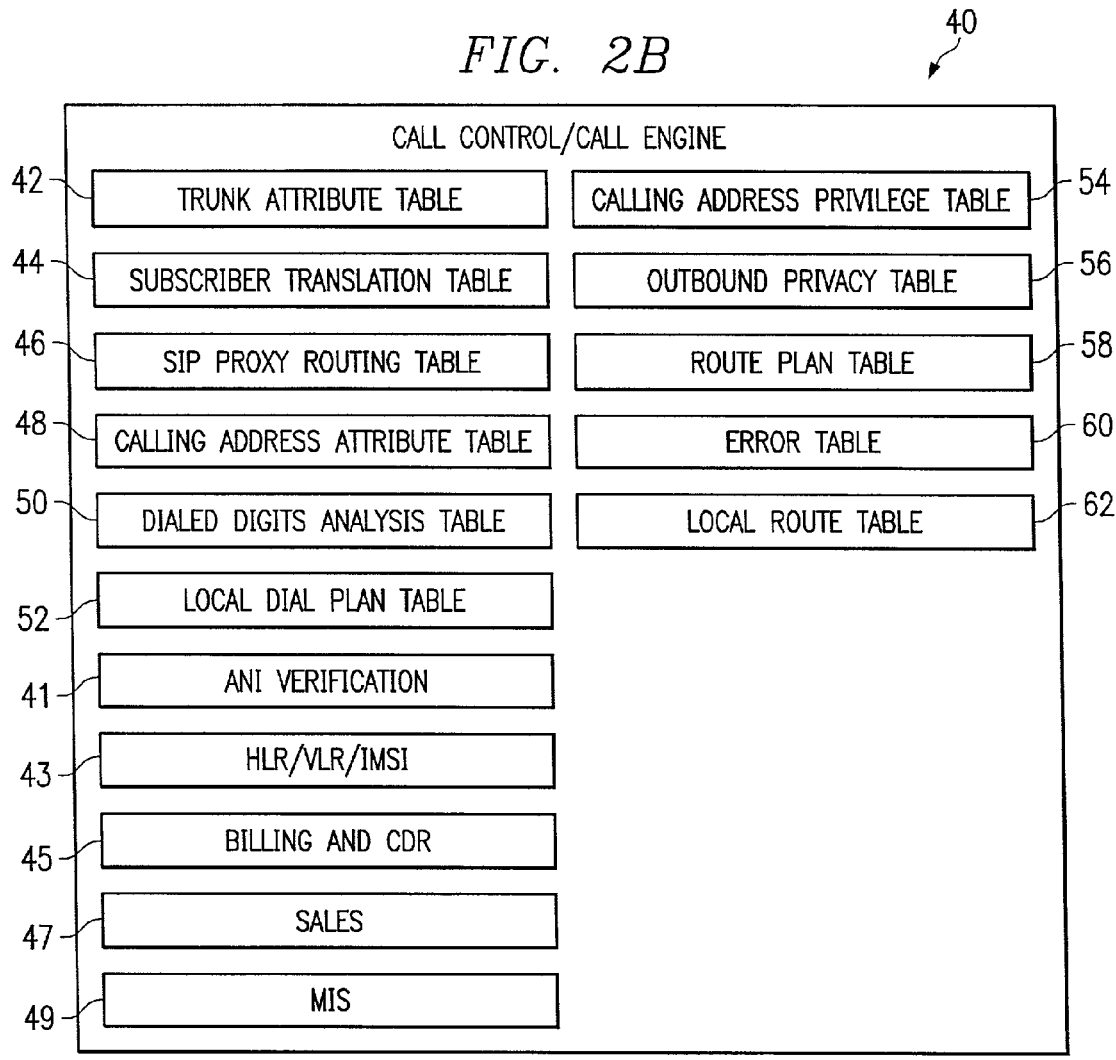
FIG. 2B is a block diagram of a database storing a plurality of tables for use with the call control engine of FIG. 2A.

FIG. 2B is a block diagram of database 40 shown in FIG. 2A. These tables include a trunk attribute table 42, a subscriber translation table 44, a SIP proxy routing table 46, a calling address attribute table 48, a dialed digits analysis table 50, a local dial plan table 52, a calling address privilege table 54, an outbound privacy table 56, a route plan table 58, an error table 60, and a local route table 62. Examples of each of these tables are provided below in tables 1 through 9 and 11, and are described below in conjunction with FIGS. 5A through 15. These tables point to additional tables that are not explicitly shown in FIG. 2B. For example, route plan table 58 points to many route tables (as described in greater detail below), including, for example, TABLE 10: LD InterLATA Table.

In some embodiments, database 40 may also include a variety of tables used for routing, authentication and verification, and fraud detection, items especially advantageous for processing of wireless calls. These tables may include information such as, but not limited to, ANI verification 41, home location register (HLR) and/or visitor location register (VLR) (HLR/VLR) and IMSI information 43, billing and call detail records (CDRs) 45, sales 47, management information systems (MIS) 49, and other information that may be used to provide services and/or features to customers. Integration of such billing functions may be customized according to the application, and may improve efficiency for maintaining and integrating functions such as billing, sales, and management information systems with call events that occur in call routing and signaling system 16. Database 40 may also include information such as correlation tables that may be used in verification for wireless calls in conjunction with an international mobile subscriber identifier (IMSI), and additional tables which may aid in verifying subscriber information and/or services that are provided to an origination or termination party. Database 40 may also include information such as dispatch circuit tables, dispatch trunk tables, and dispatch group tables. These tables may facilitate rerouting of logical connections when network congestion or malfunction is suspected and/or detected.

Database 40 may be constructed using a variety of methods, including object oriented, relational and/or hierarchical database techniques. Database 40 may also include flat files, tables or any other structure suitable for storing and/or retrieving the information desired during call processing and/or data processing events. The operation of call routing and signaling system 16 is described in conjunction with FIG. 3 with reference to FIGS. 1 and 2A.

Figure 3:
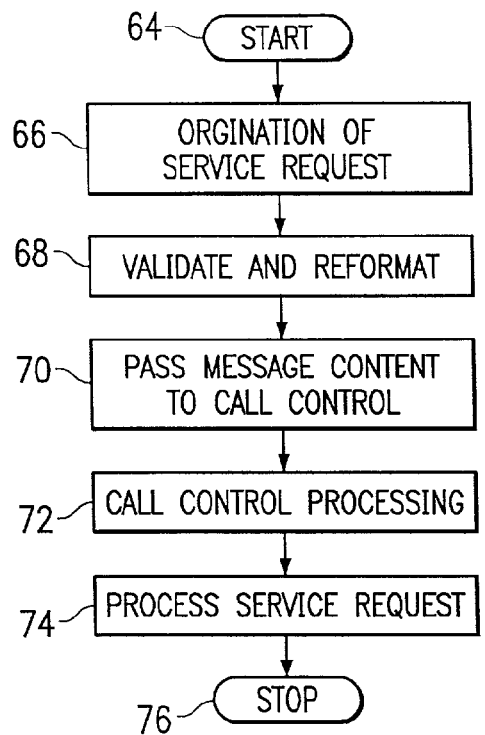
FIG. 3 is a flow chart illustrating steps associated with the call routing and signaling system of FIG. 1 processing a service request or call, over the communication network of FIG. 1.

FIG. 3 is a flow chart illustrating steps associated with call control engine 34 processing a service request, or call, over communications network 10. In operation, at a step 66 a service request is originated from within either public switched network system 12 or IP 14, and signaling is sent (SS7 or SIP, especially) to signaling agent 30. Signaling agent 30 translates that signaling for call control engine 34 at step 68. Among other things, this formatting provides a calling address format required by all call control engine 34. The translated message is passed to call control engine 34 at step 70. Call control engine 34 and route intelligence engine 36 process to call at step 72, determining the route the call should take. In particular, resource manager 28 informs intelligence engine 36 of the available trunks over which a call may be routed in response to call processing by call control engine 34, and intelligence engine 36 selects the route accordingly. Call control engine 34 processing includes determining the calling address privilege level and the call type and call attributes being requested. Intelligence engine 36 in conjunction with resource manager 28 verifies the destination requested is a valid telephone number and will calculate the appropriate route to use to terminate the call. In response to the selection of appropriate trunks, gateway agent 32 communicates with media gateway 18 over line 27 using Media Gateway Control Protocol.

According to the teachings of the invention, call control engine 34 and intelligence engine 36 process a call through a series of indexed tables in database 40 that are easily modified. Because a call processing is determined by table entries, the way in which calls are processed may be changed efficiently without complex new programming typically associated with routing calls. Additional details of call processing by all call control engine 34 and intelligence engine 36 are described below in conjunction with FIGS. 4A through 15.

Figure 4B:
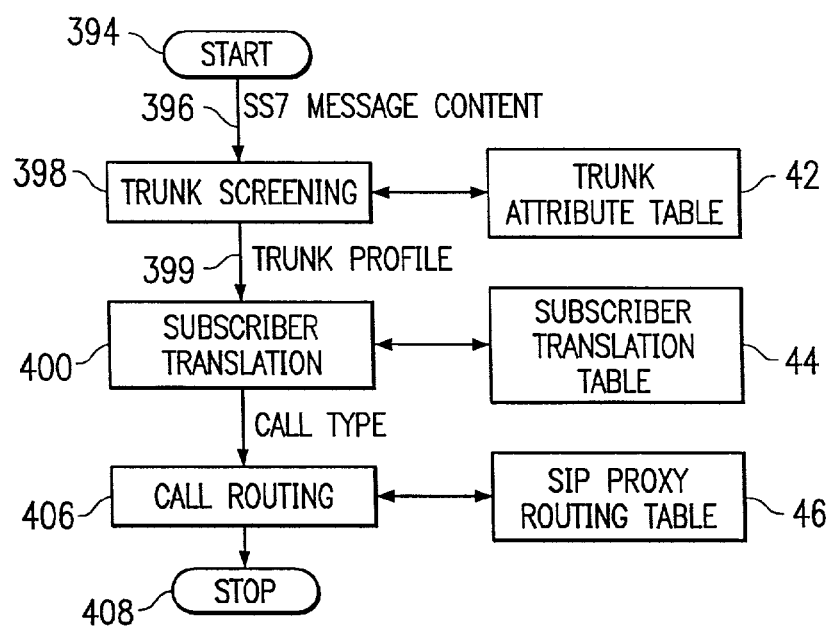
FIG. 4B is a flow chart showing steps associated with the call control engine of FIG. 2A processing a service request, or call from the PSTN to the IP network of the communication network of FIG. 1.
Figure 4A:
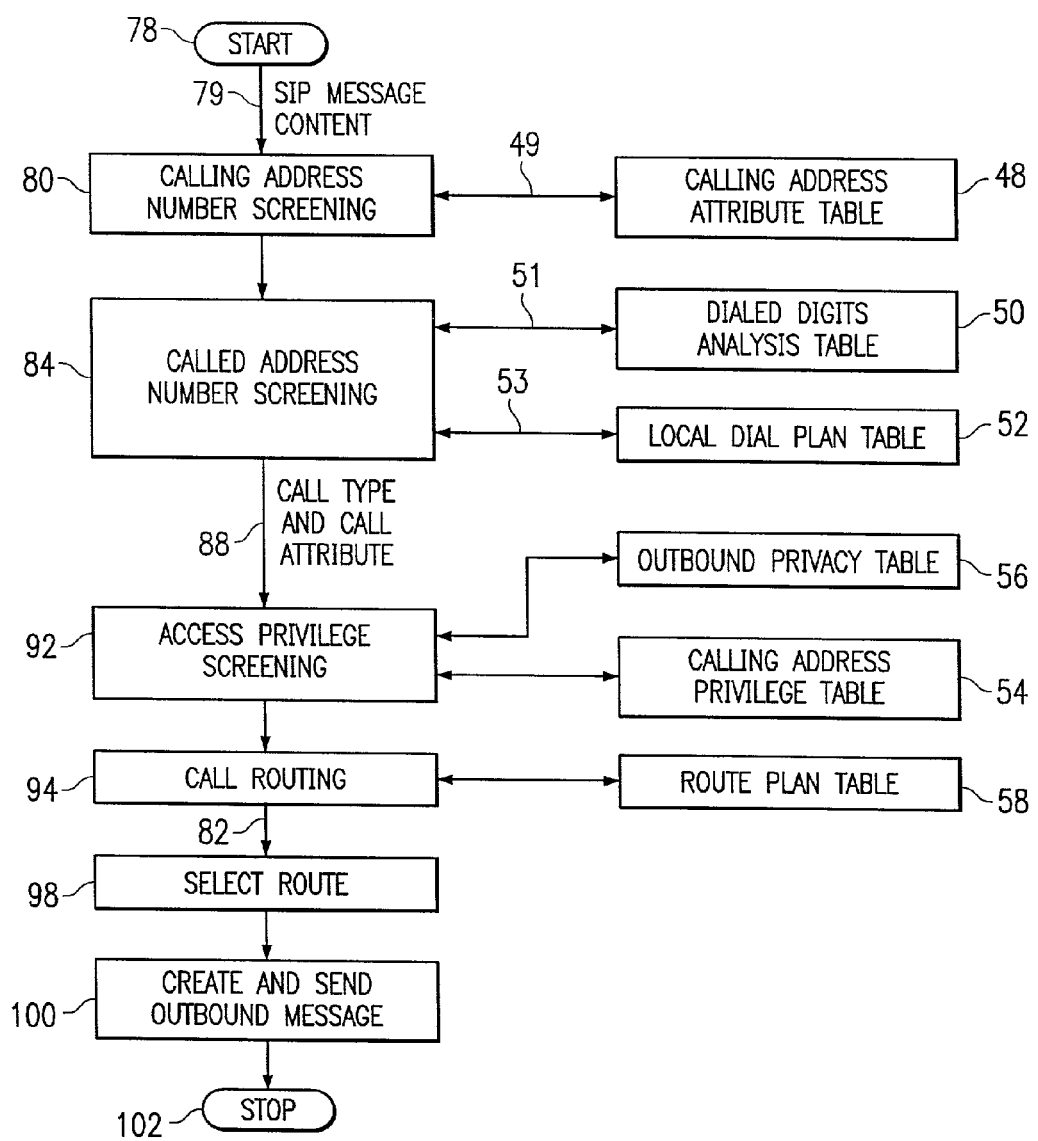
FIG. 4A is a flow chart showing steps associated with the call control engine of FIG. 2A processing a service request, or call from the PSTN to the IP network of the communication network of FIG. 1.

FIG. 4A is a flow chart showing additional details of steps associated with call control engine 34 processing a service request or call, from PSTN 12 to IP network 14. The process begins at step 78 where a translated SIP message is received by call control engine 34 from signaling agent 30, as denoted by reference numeral 79. Generally, call control engine 34 creates an instance of a calling address profile, indicated by reference numeral 82, for each service request received. A calling address profile is comprised of data defining the call type, with associated call attributes, the clients call privileges, and the final routing information to be used to determine the call. An example of a calling address profile 82 is calling address profile 166 in FIG. 5B. Call control engine 34 generates respective portions of calling address profile 82 by screening the calling address number (step 80), screening the called address (step 84), screening access privileges (step 92), and routed/intelligence engine 36 determining the call routing (step 94) and selecting an appropriate circuit (step 98). Each portion of calling address profile 82 generated by each of these steps is available for use in the subsequent step as shown generally in FIG. 4A by the reference numerals 80, 84, 92, 94, and 98. Calling address profile 82 is used at the end of this process to create and send outbound messages.

At a step 80, call control engine 34 screens the calling party by examining the calling address from the translated IP message. In this embodiment, the calling address received by call control engine 34 may be alphanumeric, in URL or e-mail format digits in E.164 or NPA-NXX-XXXX format, or other suitable format. To screen the calling address number, call control engine 34 retrieves information from calling address attribute table 48 that define the caller's access privileges, a dialed digits analysis to use, and the client's special routing instructions. In particular, call control engine 34 uses the calling address to access calling address attribute table 48, denoted by reference numeral 49. Calling address attribute table 48 provides a calling privilege index, a dialed digit analysis index, a local dial plan index, a route plan index, a treatment index, a PIC code, an LPIC, a billing index, originating information, jurisdiction information, the home NPA or 911 routing table, and an outbound privacy index associated with that calling address and billing address. Each of these terms are defined below in conjunction with Table 4 (calling address attribute table 48).

If the calling address is not found in the calling address attribute table, error processing is invoked. Error table 60 (FIG. 7B) is accessed through the treatment index in calling address attribute table 48 (Table 4). Error table 60 will treat the call accordingly, based on the treatment index and the error code. If a treatment index is not associated with the calling party, a default error table is used.

If the calling address is found in calling address attribute table 48, call control engine 48 screens the called address number at step 84 with components of calling address attribute table passed on to the step, as denoted by reference numeral 81. Call control engine 34 accesses dialed digits analysis table 50 and local dial plan table 52 to screen the called address, as denoted by reference numerals 51 and 53. At this step, call control engine determines from called digits analysis table 50 the call type with associated attributes 88 (see also FIG. 5B). Additionally, at this step, call control engine 43 analyzes the called party's local dial plan to determine if the dialed digits conform to the dialing standards required by the local calling area. After call control engine 34 verifies that the called address has been dialed correctly, it uses the call type and call attributes to select an appropriate route list table (such as route list table 162 of FIG. 5B) from route plan table 58 to determine the outbound route for use for call completion and to compose a PSTN message to set up the call. The route list table contains a route set providing possible routes for completion of the call. Intelligence engine 36 selects the ultimate circuit used. A call control engine such as call engine 34 sequentially analyzes the dialed digits as defined in the North American LSGGR standards to determine the call type and call attributes. As such, a user such as a user interacting through OAM & P GUI 38 should specify the length of acceptable digits and the range of acceptable values for each call type and each call attribute.

Once the call type and call attributes have been determined but before moving on to the next step, call control engine 34 uses a local dial plan index (from calling address attribute table 48) to retrieve the local dial plan table 52 specific to the calling party. Data in local dial plan table 52 dictates the maximum and minimum format required to be dialed for each call case. If a local dial plan requirements have been violated, an error will be generated and error processing will be invoked.

Once call control engine 34 completes address number screening at step 84, call control engine 34 screens access privileges at step 92. To do so, call control engine 34 may utilize calling address privilege table 54. At this step, call control engine 34 assesses call type and call attributes 88 to determine if the calling address has the privileges to place the call. Call control engine 34 identifies privilege levels and provide a user, such as user 39, the ability, through OAM & P 38 and to assign, modify, or remove any combination of privileges to any calling address. According to one embodiment, the following privileges may be assigned: emergency services (e.g., 911) local and special codes and service, operator assisted, Intra-LATA toll calls, international calls, carrier access code (CAC) calls, and service access code (SAC)calls, (e.g., 800, 900). Additional calls that may be provided are SIP address calls and per use calls. If call control engine 34 finds the calling address does not have the privilege level to complete the call requested, an error will be generated and error processing will be invoked. If the calling address does have the privilege to complete the call, then a call type allowed flag (not explicitly shown) is set and call control engine and router/intelligence engine route the call at Step 94. At this step 94, call control engine 34 retrieves outbound privacy information using an outbound privacy index (index 132 in FIG. 5A) stored in calling address attributes Table 58. This index 132 indicates which outbound privacy table 56 call control engine 34 looks to determine privileges.

This outbound privacy table 56 dictates whether or not privacy indicators need to be set in the terminating PSTN message. Privacy may be required for the calling party address, the calling party name, or the calling party IP address. Privacy may be indicated for any of these parameters in one of three ways: the SIP message header may include a parameter indicating that privacy should be invoked, alternatively, the dialed digits may contain the *67 prefix indicating privacy; lastly, a subscriber may specify privacy across all calls. In the last case, outbound privacy table 56 states which parameters need to be suppressed. If any of these three indicators is detected by call control engine 34, the appropriate calling party information is suppressed in the final PSTN message.

Call control engine 43 uses a route plan index (index 116 in FIG. 5A) together with the call type and call attributes 88 to retrieve an appropriate route list table. A route list table is a table specified by route plan table 58 and specifies a set of routes, or route set, that may be used to complete the call. Example route list tables are found in the third column of Table 9: Route Plan Table. Call type and call attributes 88 are keys to route plan table 58 (e.g., they determine which values from the table are used).

Once call control engine 34 determines the route at step 94, calling address profile 82 is complete, as indicated by reference numeral 82 between steps 94 and 98. Call control engine 34 uses calling address profile 82 and call type and call attributes 88 to determine the route to use to complete the call request and to formulate the PSTN message to be sent, and provides the determined route, or route set, to resource manager 28 to choose the outbound circuit at step 98. Call control engine 34 receives the outbound circuit and sends it and the calling address profile at step 100 to signaling agent 30 to create and send the PSTN call setup message, per, in this example, GR3 317 specifications. The process concludes at step 102.

FIG. 4B is a flow chart showing additional details of steps associated with call control engine 34 processing a service request, or calls from IP network 14 to PSTN 12. The method begins at step 394 where signaling agent 30 provides a translated SS7 message to control engine 34, as denoted by reference numeral 396. Generally, call control engine 34 identifies the called party (rather than calling address), call type and attributes, and determining the destination at which the call should terminate. This process is described below. At step 398, call control engine 34 performs trunk screening. Call control engine 34 creates an instance of a called party profile (not explicitly shown) for each service request received. This is in contrast to calling address profile 82 created for calls originating in PSTN 12. As with the calling address profile 82, a called party profile is comprised of data defining the call type and call attributes, such as call type and call attributes 88, called party call privileges, and the final routing information to be used to terminate the call. Therefore, call control engine 34 accesses tables based upon the called number that define the called party's destination, privileges, and special routing instructions.

Call control engine 34 uses the trunk identification provided by translated SS7 message 396 to access trunk attribute table 42. Trunk attribute table 42 contains a subscriber translation index, an SIP proxy routing index, the call attribute/call type index, and CLLI. The subscriber translation index points to subscriber translation table, which provides formats for the calling party (or called address in case of on-net calls). The SIP proxy routing index in trunk attribute table 42 (see TABLE 1: Trunk Attributes Table) is the pointer to the SIP proxy routing table, which provides the SIP proxy to be used on the domain. The call type attribute index in trunk attribute table 42 defines what call types are associated with the trunk. The CLLI index in trunk attribute table 42 provides the common location language identifier that is associated with the trunk and will be populated in SS7 messages.

If the trunk ID is not found in trunk attributes table 42, call control engine 34 assumes there are no special privileges to find and proceeds to call type identification. If the trunk ID is found, the called party privileges are returned and used to determine whether the call should be terminated. This helps determine how the call is routed. If a processing error arises, an error is generated and error processing is invoked.

On completion of trunk screening, call control engine 34 identifies call type at step 400 of trunk screening. Trunk screening at step 398 provides an index for subscriber translation table 44 for the incoming trunk identification in trunk attribute table 42. When call control engine 34 accesses subscriber translation 44 table, if an SIP URL, IP address or e-mail address is associated with the number, this specifies that the termination is an SIP termination. However, if there is no SIP URL, IP address, or e-mail address, this specifies that the termination is a non-SIP termination.

Step 400 of subscriber translation generates a call type 88. Based on call type 88, trunk profile 399, and the original translated SS7 message, call control engine 34 performs access privilege screening in an analogous manner as the access privilege screening of step 92, described above in conjunction with FIG. 4A.

At a step 406, call control engine 34 routes the call. To do so, remaining data necessary to create and route an SIP message are assembled at step 406. This includes identifying the destination proxy. To accomplish this task, call control engine 34 determines the called party's domain name from the SIP address. The domain name is then used as a key in accessing SIP proxy routing table 46. SIP proxy routing table 46 dictates which proxy is used to terminate the call. SIP proxy routing table 46 also allows user 39 to assign several NPA-NXXs to one CMS. The process concludes at step 408.

In this example, a caller calls from IP network 14 to a destination in PSTN 12. In this example, the called number is simply "0", indicating an operator.

Calling address attributes table 48 (which is also shown as TABLE 4: Calling Address Attributes Table) includes a plurality of indices. Those indices are: dialed digits analysis index 110, local dial plan index 112, calling address privilege index 114, route plan index 116, treatment index 118, "911" index 130, and outbound privacy index 132. Calling address attributes table 48 also includes variables that are not indices, but rather actual values. Those are: PIC 120, LPIC 122, JIP 124, II 126, HNPA 128, billing 134, and billing address 132. Each of these indices or variables is described in greater detail below in conjunction with TABLE 4: Calling Address Attributes Table.

A key for calling address attribute table 48 is the calling party number. In other words, a calling address attribute table exists for each calling party number. The calling party number, or calling address, may be alphanumeric, may be in URL or e-mail format, or may be digits in e.164 or NPA-NXX-XX format.

Figure 5A:
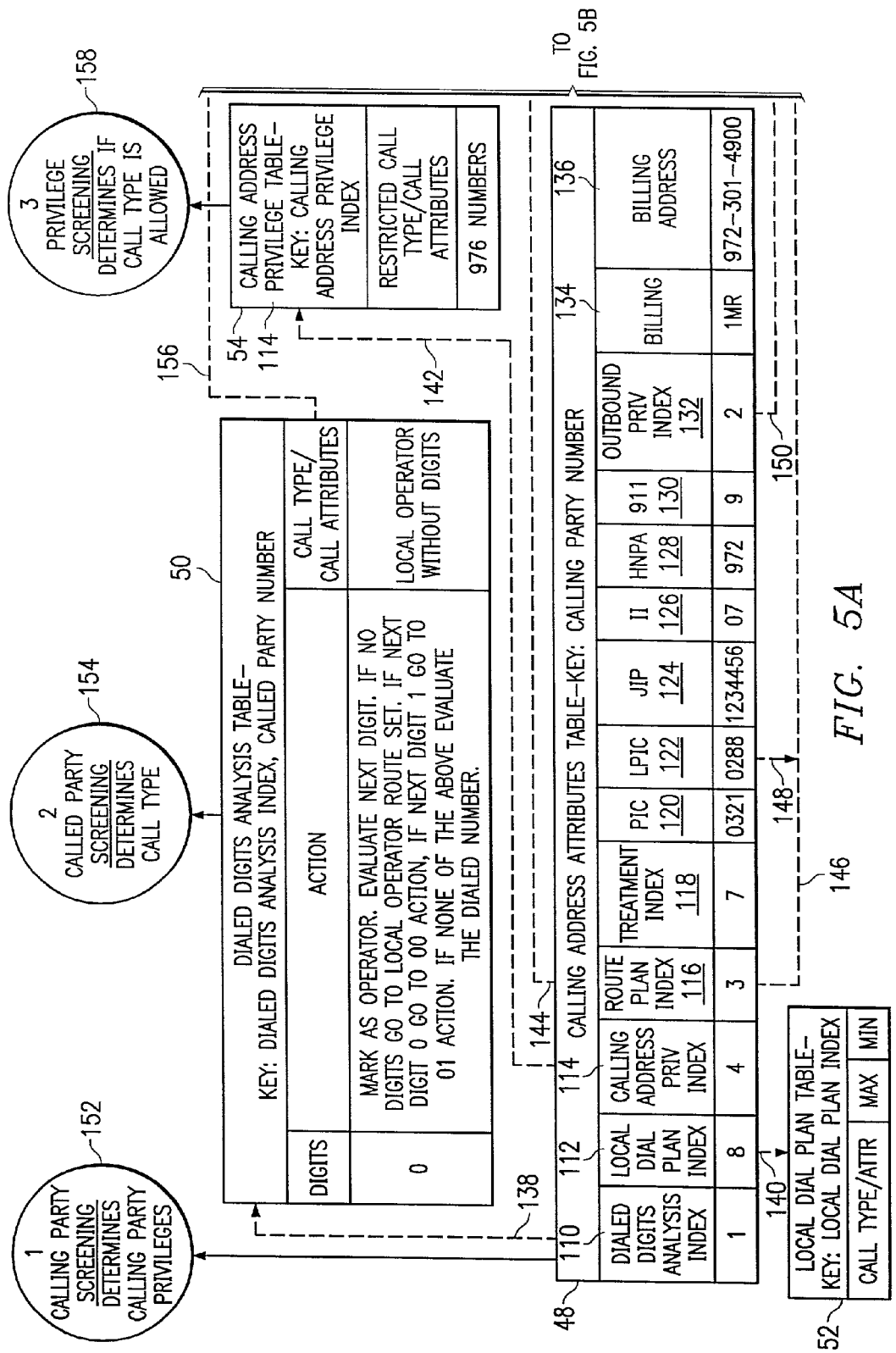
FIGS. 5A and 5B are schematic drawings showing tables and steps associated with the call control engine of FIG. 2A processing an operator services call, with no number provided.
Figure 5B:
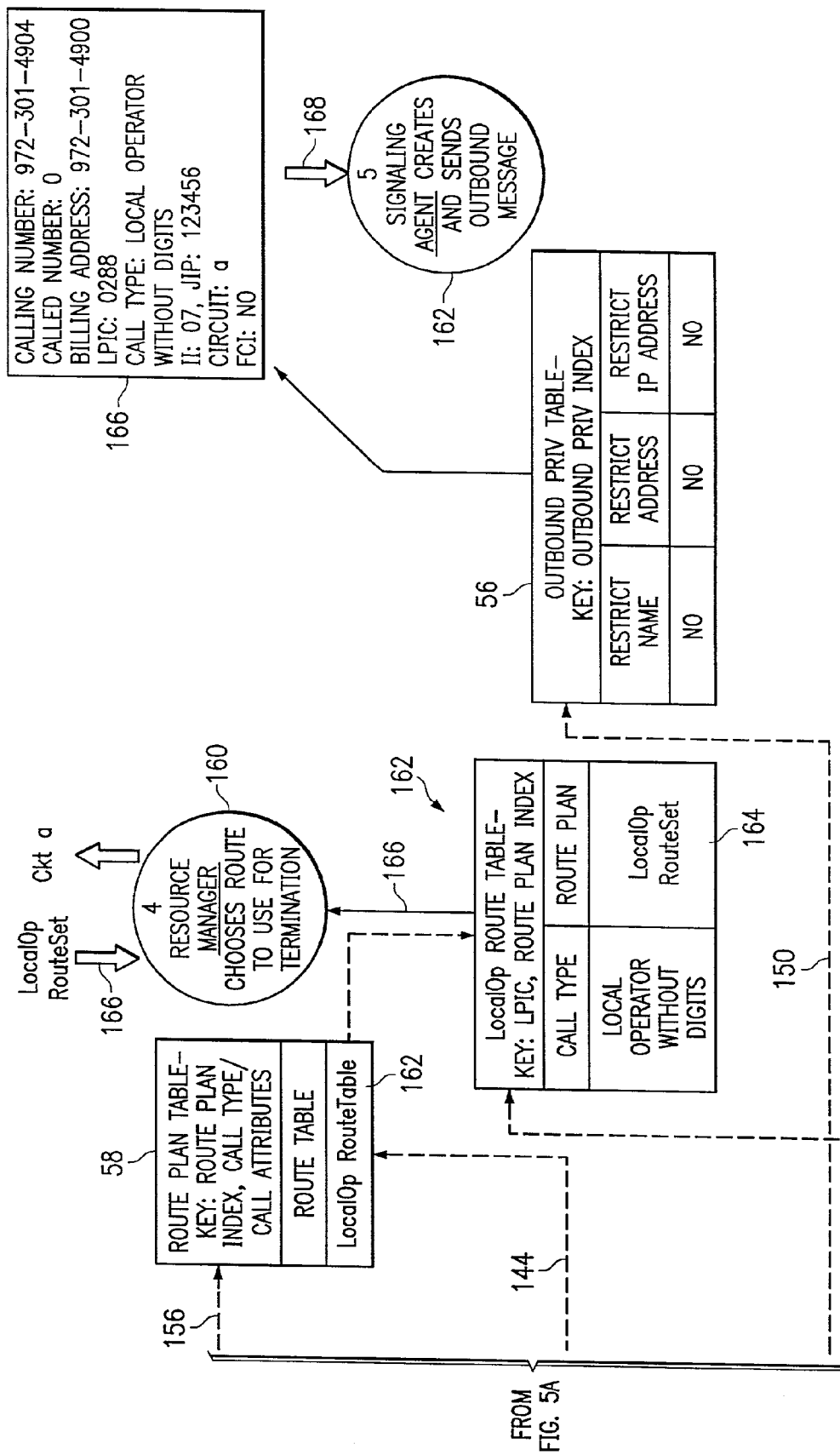

Dialed digits analysis index 110 is a pointer to dialed digits analysis table 50, as indicated by reference number 138. Local dial plan index 112 is a pointer to local dial plan table 52, as indicated by reference number 140. Local dial plan table 52 identifies, based on the calling party, what the user's local dial plan looks like, i.e., for each particular call type, the format of the number, including maximum and minimum number of digits. Calling address privilege index 114 is a pointer to calling address privilege table 54 as indicated by referenced numeral 142. Calling address privilege table 54 identifies the call type restrictions for a particular calling party. Route plan index 116, which is based on the calling party, along with other keys, is a key to route plan table 58, as demonstrated by reference numeral 144. Route plan table 58 specifies a route list table, such as route list table 162 (FIG. 5B). Route list table 162 in turn specifies which route set to use, which is based on the calling party's profile (route plan index 116) and other factors as the case may be, such as call type, and LPIC index 122 and PIC index 120.

Treatment index 118 is a pointer to error table 60. Error table 60 is used to decide what type of treatment to use based on a particular error condition and the calling address. PIC 120 is the calling party's long distance carrier ID code. LPIC 122 is the calling party's local service provider carrier ID code and is used as a key to route list table 162, as denoted by reference numeral 148. LPIC 122 is provided in this example to local route table 162 as indicated by reference numeral 148. JIP 124 refers to jurisdiction information and identifies the switch from which the call originates and can be recorded to identify that switch. II 126 identifies the originating line. For example, if the calling party is calling from a prison phone, pay phone or regular phone.

HNPA (Numbering Plan Area) index is the home NPA, which defines the NPA for the calling party. "911" index 130 is a pointer to the 911 route table to identify what 911 route set to use for the calling user. Outbound privacy index 132 is a pointer to outbound privacy table 56, as indicated by reference numeral 150. Billing 134 identifies the billing rate to use for the calling user. Billing address 136 is the address that the call is billed to, and may be alphanumeric, URL, or e-mail format, or may be digits in E164 or NPA-NXX-XXXX format.

Call control engine 34 processes this example call as described below. At step 152, call control engine 34 screens the calling party to determine the calling party privileges. To do this, call control engine 34 examines calling address attribute table 48. In particular, the caller in this example has a calling party privilege index 114 of "4." This index therefore points to a particular calling address privilege table 54 that has only "976" numbers restricted. At step 154 call control engine 34 screens the called party to determine the call type. In particular, dialed digits analysis index 110, which for this calling party is "1", points to a particular dialed digits analysis table 50. Based on dial digits in analysis table 50, the call type and call attributes 88 is determined to be "local operator call without digits." The call type and call attributes 88 for this particular call are used as a key to select an appropriate route list table from route plan table 58, as denoted by reference numeral 156.

At step 158, call control engine 34 screens privileges to determine if the particular call type 88 is allowed. In this example, the call type 88 is a local operator call without digits. Calling address privilege index 114 identifies a calling address privilege table 54, which specifies that the only restrictions on the calling party are 976 numbers; therefore, the call type is allowed.

A route plan table 58 is indexed by route plan index 116 and call type and attributes 88. These two indices specify the route list table listed in route plan table 58 that is be used for the call. In this example, the route list table selected (162) is identified as "LocalOp" Route Table. Selected route list table 162 is an example of a plurality of route list tables that include list of routes that can be used to terminate the call request. This list is referred to as a route set. In this example the route set is LocalOp Route Set 164. This route set 164 is passed, as denoted by reference numeral 166, for use by resource manager 28 to choose the route, or outbound circuit (denoted by "Ckt a"). Route manager 28 chooses the outbound circuit by mapping the route set to difference CLLIs. The CLLIs point to a trunk group, and there are different circuits in each trunk group. Call control engine 34 receives the outbound circuit and provides it and calling address profile 166 to signaling agent 30, as denoted by reference numeral 168. At step 162, signaling agent 30 creates and sends the outbound message based upon the selected circuit and incorporates any outbound privacy restrictions denoted by outbound privacy table 56. In this case no outbound privacy restrictions are in place. In addition, signaling agent 30 formats information received from call control engine 34 into a proper signaling format message.

Figure 6A:
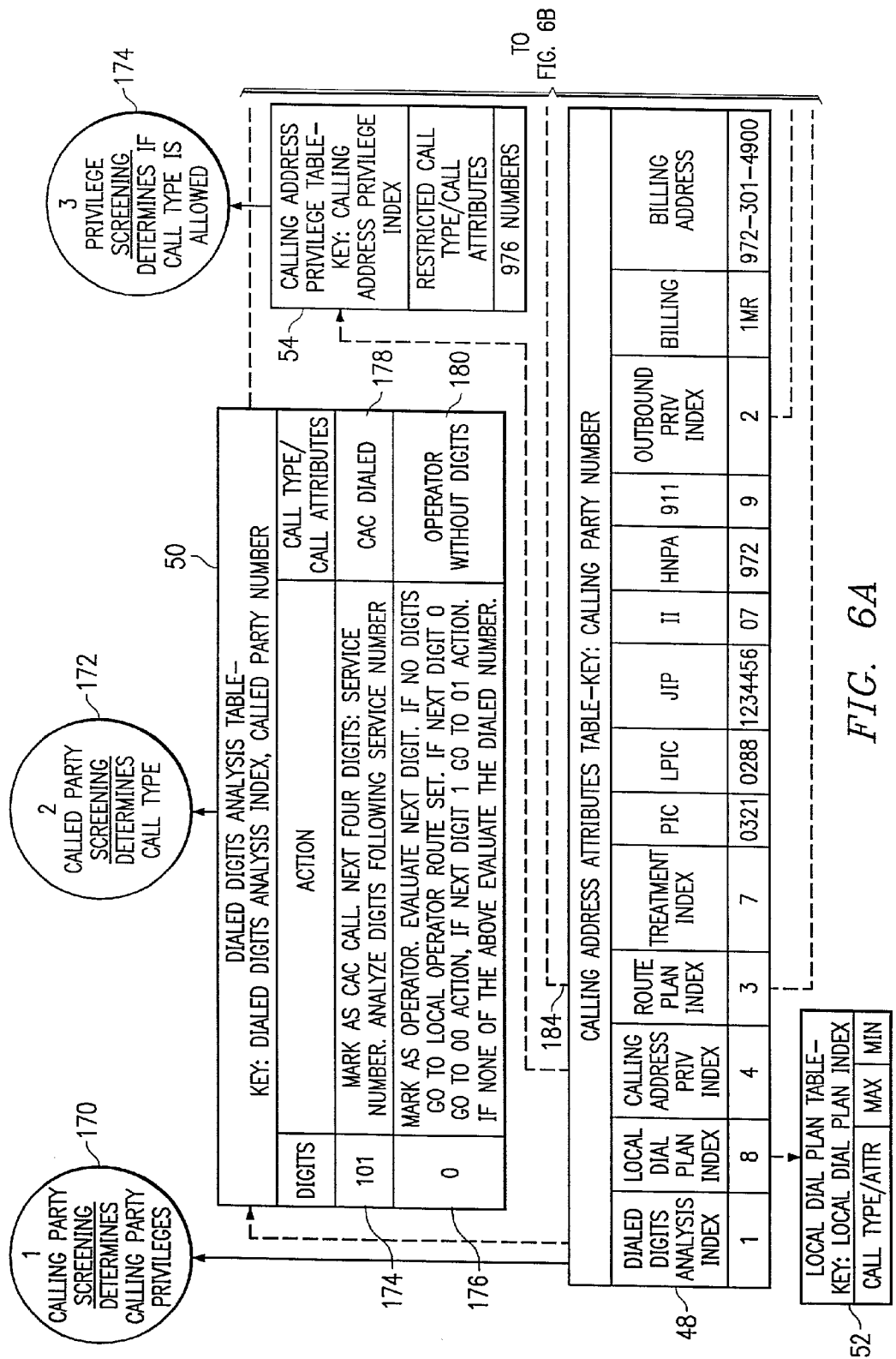
FIGS. 6A and 6B are schematic drawings showing tables and steps associated with the call control engine of FIG. 2A processing a carrier access code service request, dialed without digits, originating from the PSTN of FIG. 1 for termination in the IP network of FIG. 1.
Figure 6B:
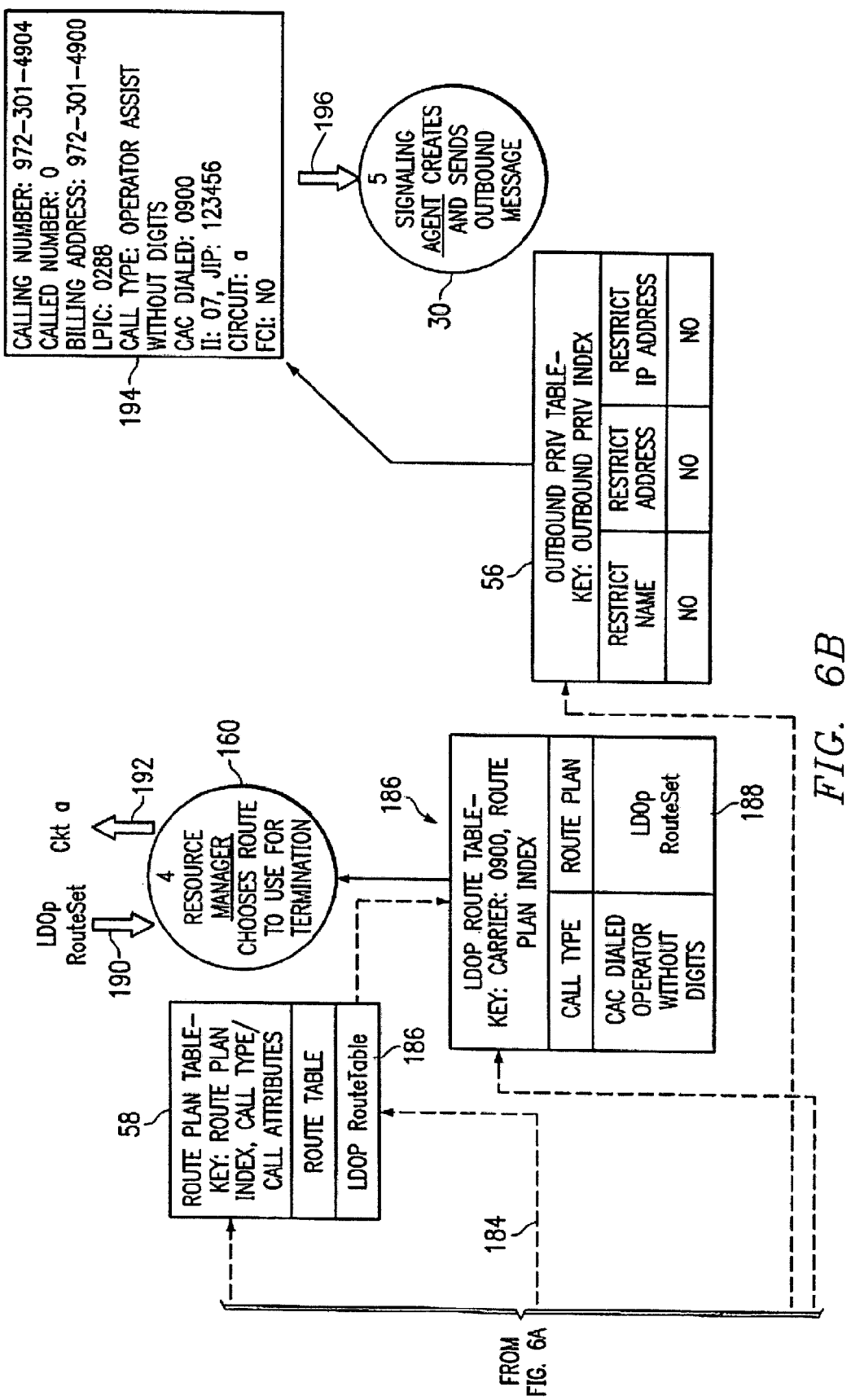

FIGS. 6A and 6B are schematic diagrams showing tables and steps associated with processing a carrier access code request. FIGS. 6A and 6B illustrate processing of a carrier access code call that is dialed without digits "10109000." In this example, "0900" represents the carrier. Differences between call control engine 34 processing the call of FIGS. 5A and 5B and call of FIGS. 6A and 6B are highlighted below. The calling address specifying table 48 is the same as in FIGS. 5A and 5B because this table is keyed off of the calling party address, which is the same (972-301-4900). At a step 170, call control engine 34 screens the calling party in calling party a similar manner to step 152. At a step 170, call control engine 34 screens the called party. Call control engine 34 screens the called party using dial digits analysis table 50, using dialed digit analysis index 110 and the called party number as keys. In this example, the called party number is "10109000." The first three digits "101" indicate that the call is a carrier access code call, as denoted by reference numeral 174. Call control engine 34 then examines the next four digits of the call, which in this case is the service number, or identifier of the actual carrier (0900). The next digit examined "0", specifies the call is to an operator, as denoted by reference numeral 176. Call control engine 34 then evaluates the next digit. In this case, there are no digits, so a call attribute of operator without digits is set, as denoted by reference numeral 180. Thus, the dialed digits are analyzed to determine call attributes (such as blocking calling party ID presentation—*62) and call type (such as operator, long distance, international, local, etc.). If additional digits were dialed, such as the actual phone number of a called party, they are analyzed after the appropriate route table is located.

Route plan table 58 uses call type and attributes 88, as denoted by reference numeral 182 as a key in selecting an appropriate route list table. In addition, route plan table 58 also uses as a key route plan table index 116, as denoted by reference numeral 184. Based on route plan index 116 and call type and attributes 88, call control engine 34 selects the appropriate route list table from route plan table 58. In this example, the selected route list table 186 is "LDOP Route Table 186." Route list table 186 stores the list of routes that can be used to terminate the call request, or route set 188. Resource Manager 28 provides route set 188, as described above and indicated by reference numeral 190. In response, Resource Manager 28 chooses the outbound circuits as designed by reference numeral 192. Call control engine 34 adds the determined circuit information to call address profile 194 and provides it to signaling agent 30, as indicated by reference numeral 196. Signaling agent creates and send the outbound message according to provided data 194.

In this manner, the call is processed.

Figure 7A:
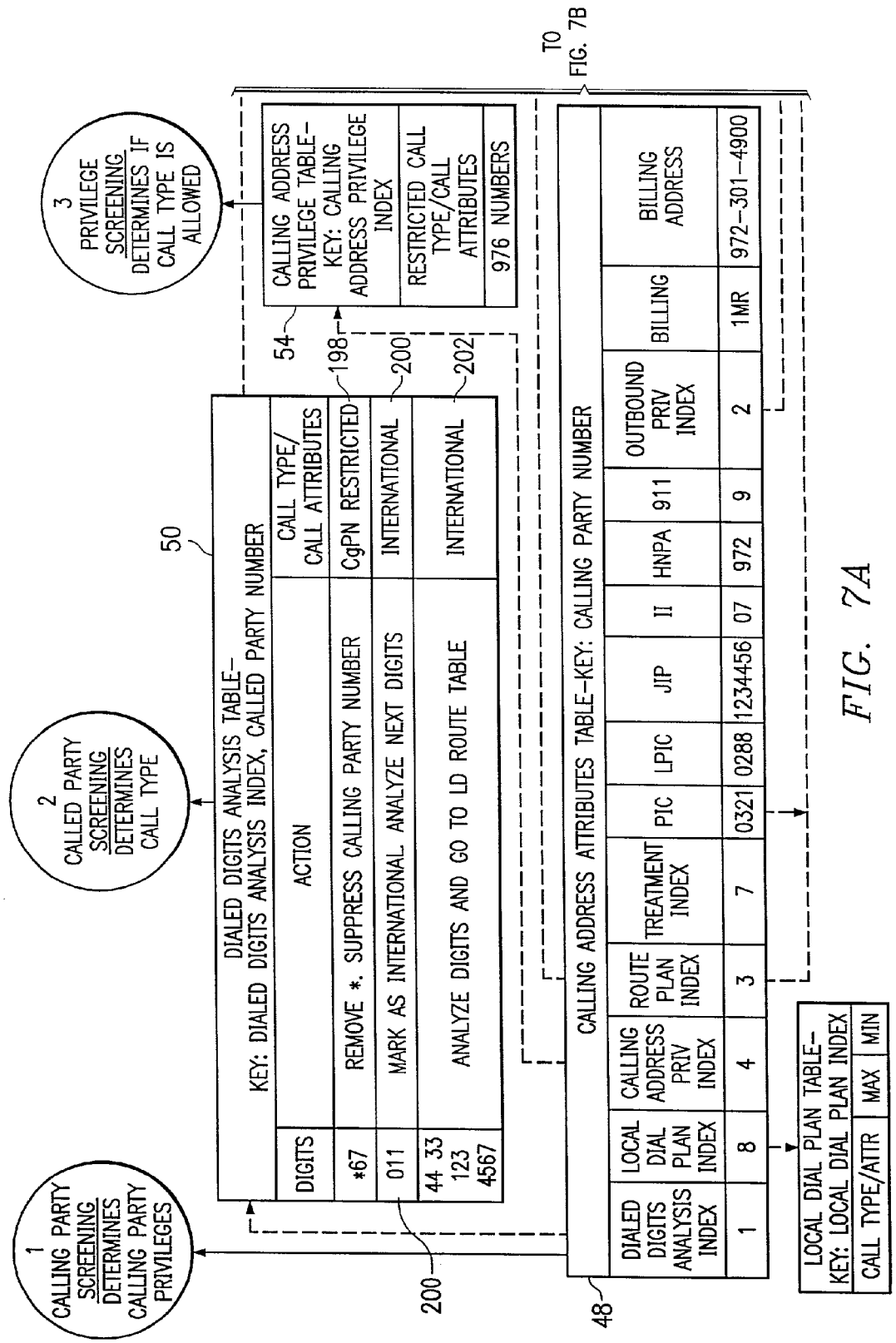
FIGS. 7A and 7B are schematic drawings showing tables and steps associated with the call control engine of FIG. 2A processing an international, calling party requested, service request originating from the PSTN of FIG. 1 for termination in the IP network of FIG. 1.
Figure 7B:
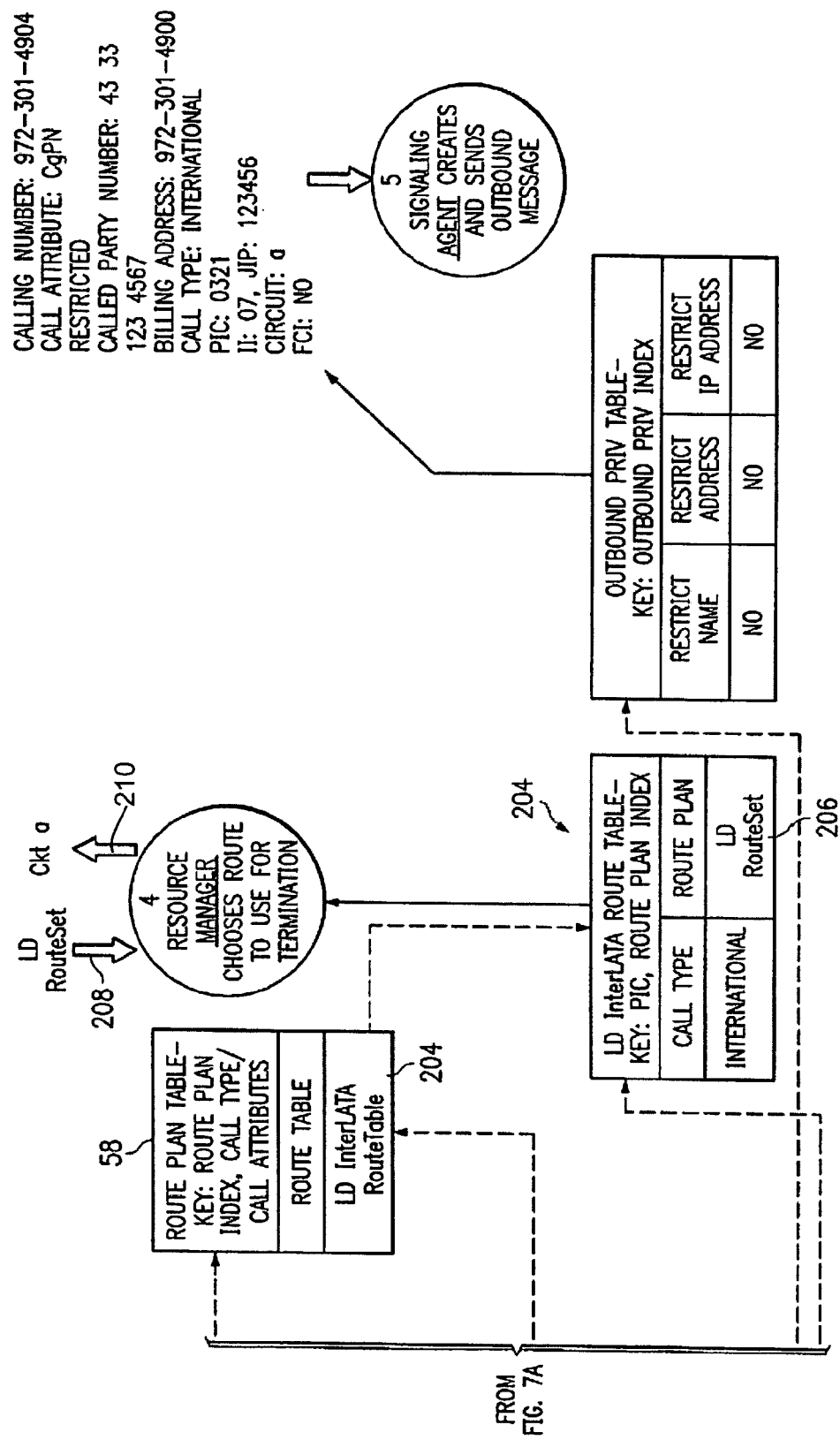

FIG. 7 are schematic diagrams showing tables and steps associated with processing an international, calling party requested request. FIGS. 7A and 7B illustrates the call processing of an international calling party restricted phone call, which in this example is "*6701144331234567." Only differences between call processing of FIGS. 5A and 5B and 7A and 7B are described.

Based on the dialed digits (*6701144331234567), dialed digits analysis table 50 is accessed. The digits "*67" indicate to suppress the calling party number, as indicated by reference numeral 198. Call control engine 34 determines the call is an international call based on the digits "011." The remaining digits (44331234567) do not affect how the tables are assessed, but are analyzed in conjunction with an appropriate route table, as indicated by reference numeral 202.

Based on the call type and attributes 88 for this called number found in dialed digit analysis table 50, and route plan 116, call control engine 34 uses route plan table 58 to select an appropriate route list table 204, which in this case is "LD Inter LATA" Route Table. Route list table 204 specifies route set 206. Call control engine 34 provides route set 206 to resource manager 28, as indicated by a reference numeral 208. Resource manager 28 selects an appropriate circuit for terminating the call as indicated by reference numeral 210.

Figure 8A:
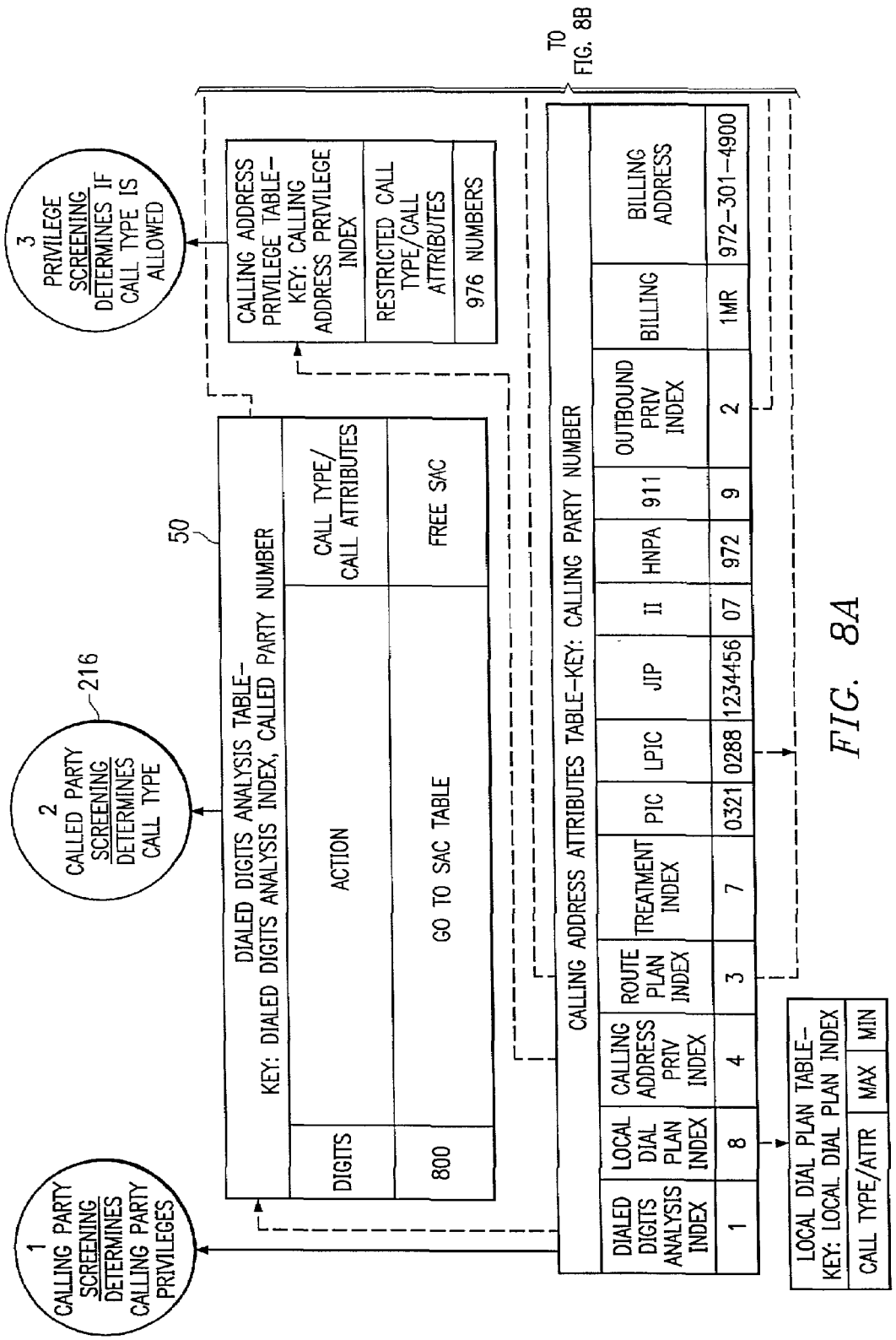
FIGS. 8A and 8B are schematic drawings showing tables and steps associated with the call control engine of FIG. 2A processing free service access code service requests originating from the PSTN of FIG. 1 for termination in the IP network of FIG. 1.
Figure 8B:
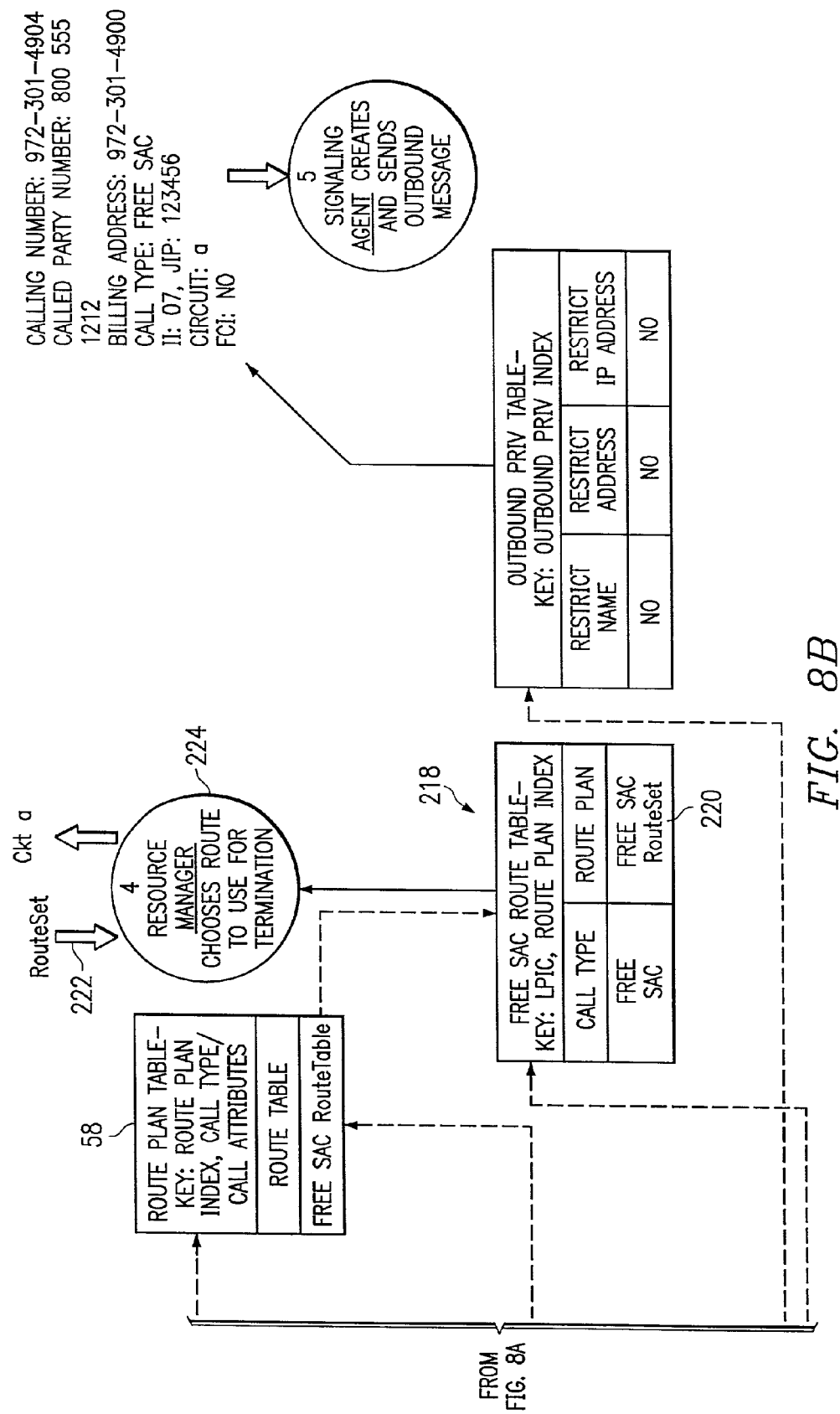

FIGS. 8A and 8B are schematic diagrams showing tables and steps associated with processing free service access code requests. FIGS. 8A and 8B show call processing for a free service access code, in this example "800-555-1212." Based on the dialed digits "800", call control engine 34 determines from dialed digits analysis table 50 that the call type is a free service access code call at step 216. Based on this call type 88, call control engine 34 selects from call plan table 58 a route list table 218, which in this case has a title of "Free SAC Route Table." Route list table specifies route set 220 to provide to resource manager 28 as described in above, and indicated by reference numeral 222. Resource manager 28 then selects an appropriate circuit, as described previously.

Figure 9A:
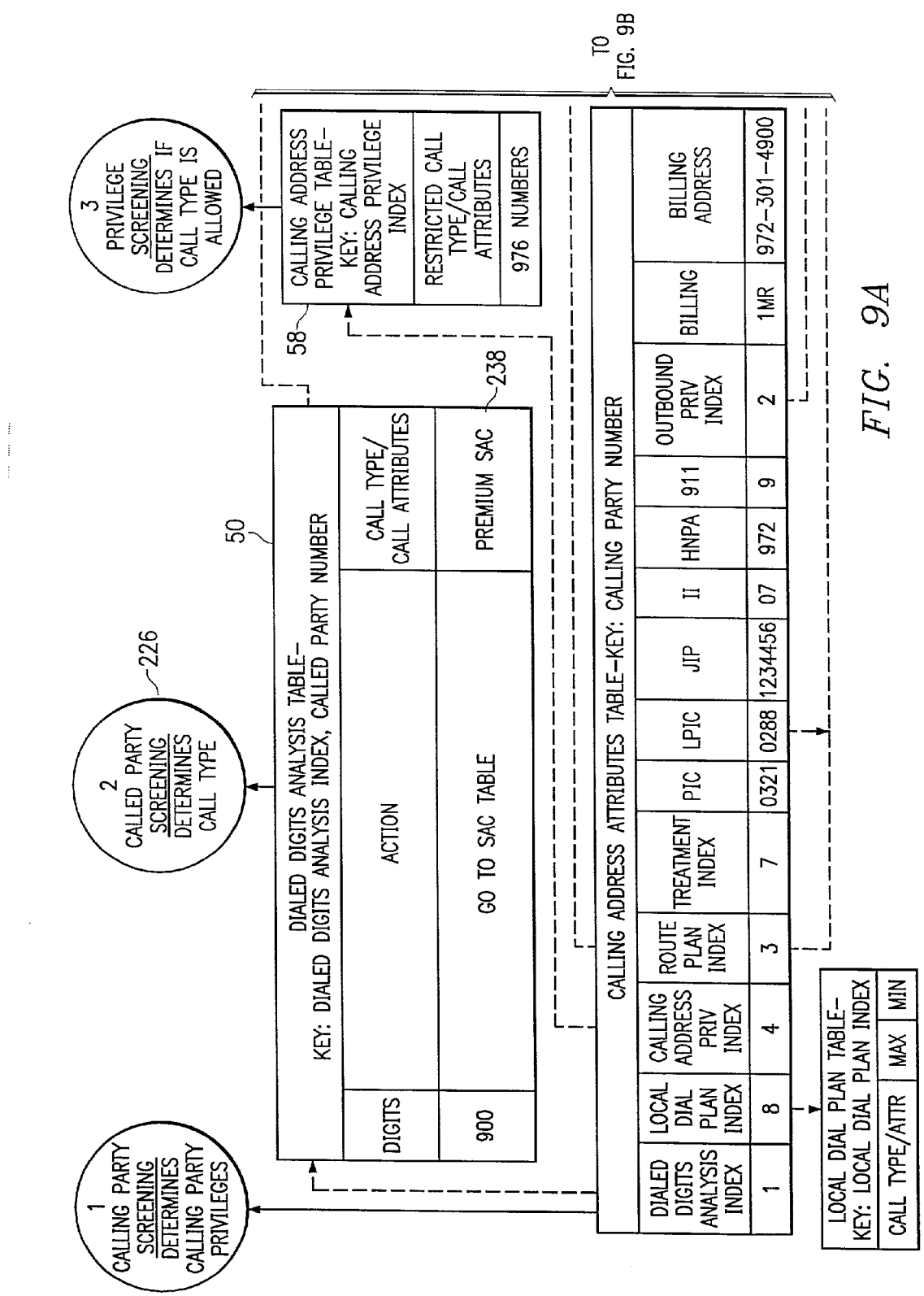
FIGS. 9A and 9B are schematic drawings showing tables and steps associated with processing a premium services access code service request originating from the PSTN of FIG. 1 for termination in the IP network of FIG. 1.
Figure 9B:
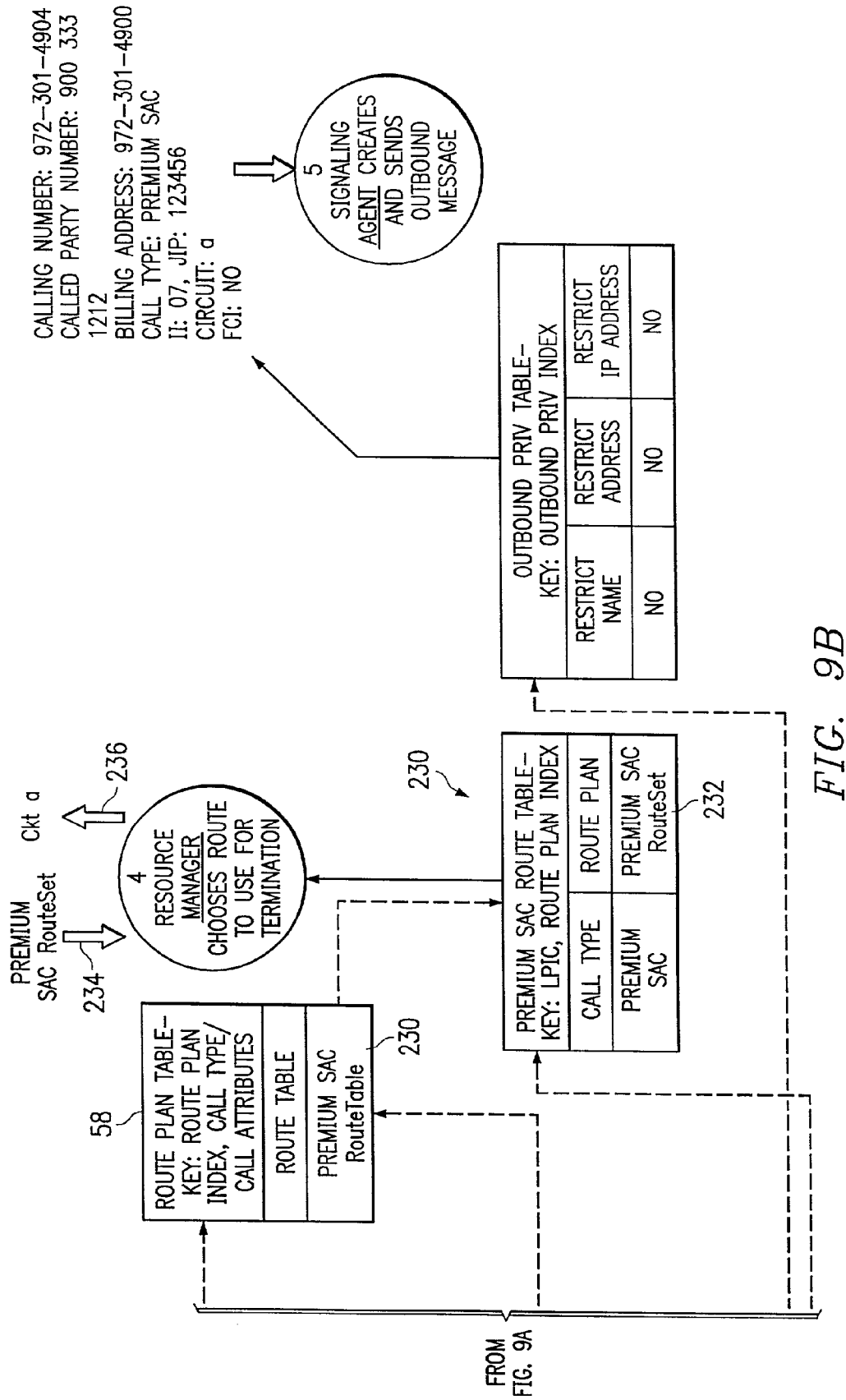

FIG. 9 are schematic diagrams showing tables and steps associated with processing a premium services access code request. FIGS. 9A and 9B illustrate an example of call process for a premium service access code call such as "900-333-1212." Based on the called digits "900," call control engine 34 then determines from dialed digits analysis 50 at step 226 that the call type 88 is a premium service access code call, as illustrated by reference numeral 238. Call control engine 34 uses this call type 88 to identify within route plan table 58 a route list table 230, which in this case has a title "Premium SAC Route Table." Route list table 230 specifies a route set 232 having a title in this case of "premium SAC route set." Route set 232 is provided to resource manager 28 as denoted by reference numeral 234. Resource manager 28 determines the appropriate circuit for completing the call, as denoted by reference numeral 236, and processing proceeds as described above.

Figure 10A:
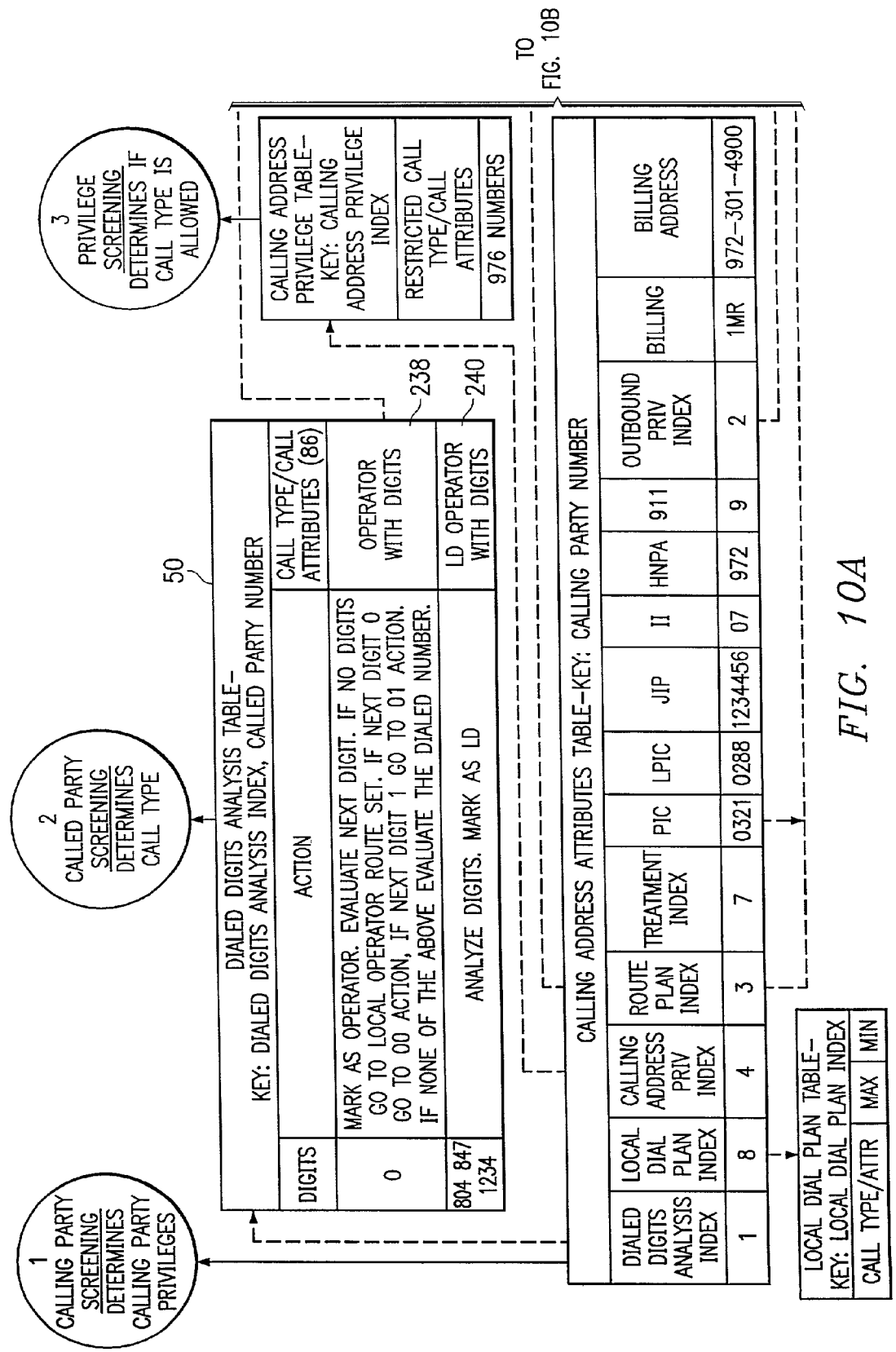
FIGS. 10A and 10B are schematic drawings showing tables and steps associated with the call control engine of FIG. 2A processing an operator with digits dialed service request originating from the PSTN of FIG. 1 for termination in the IP network of FIG. 1.
Figure 10B:
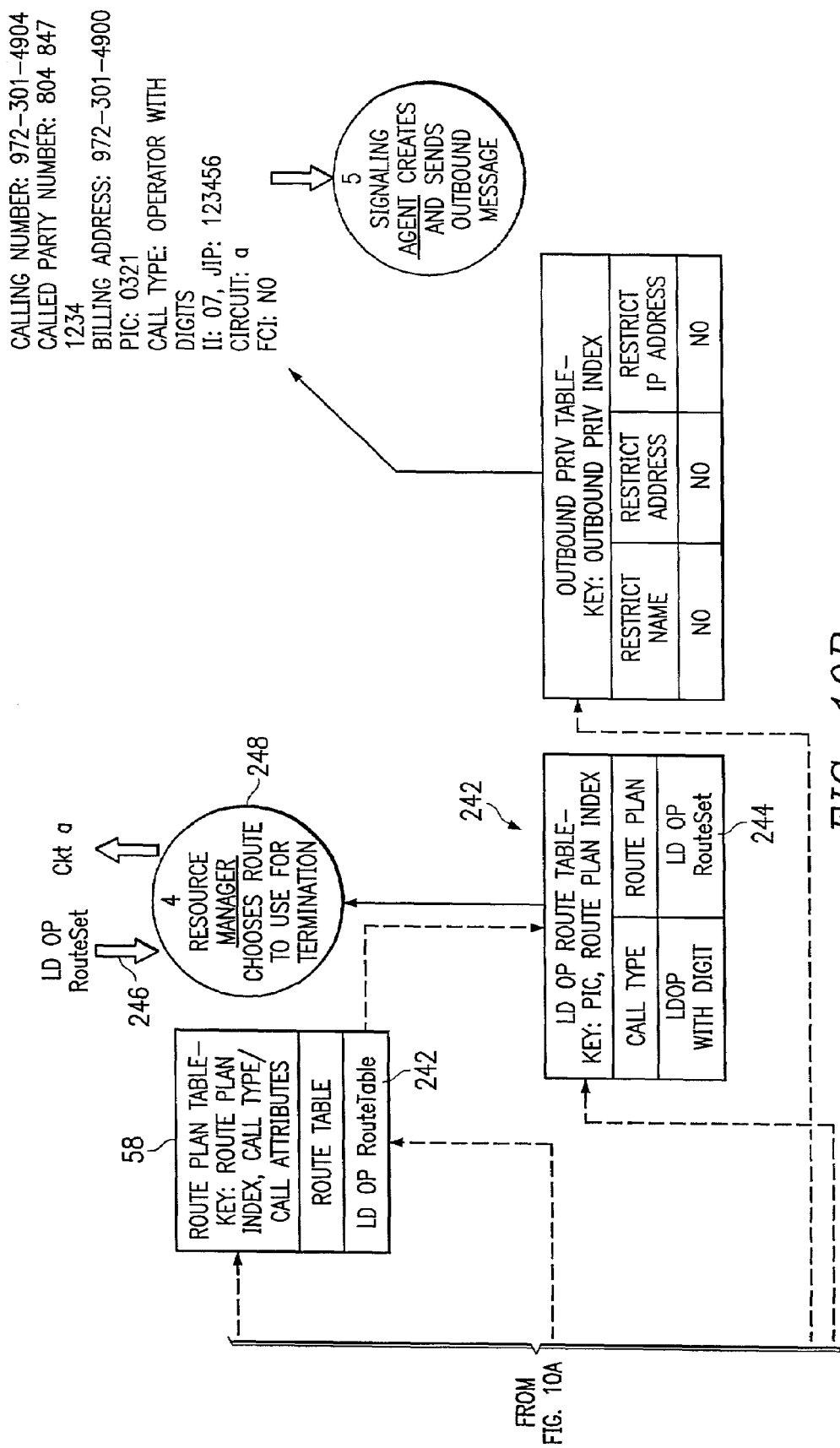

FIG. 10 are schematic diagrams showing tables and steps associated with processing an operator with digits dialed request. FIGS. 10A and 10B show call processing for an operator with digits call, for example, "08048471234." Based upon the dialed digits "0" call control engine 34 determines from dialed digits analysis table 50 that the call type 88 is an operator with digits call, as denoted by reference numeral 238. Based on the digits "8048471234" call type and attributes 88 is determined to additionally include the fact that the call is a long distance operator with digits. This is indicated by reference numeral 240. Call control engine 34 utilizes this call type and attributes 88 in conjunction with route plan table 58 to select a suitable route list table 242. In this case, route list table 242 has a title of "LD OP Route Table." Route table 242 specifies a route set 244, which is provided to resource manager 28, as indicated by reference 246. Resource manager 18 selects an appropriate circuit at step 248 in a similar manner to that described above.

Figure 11A:
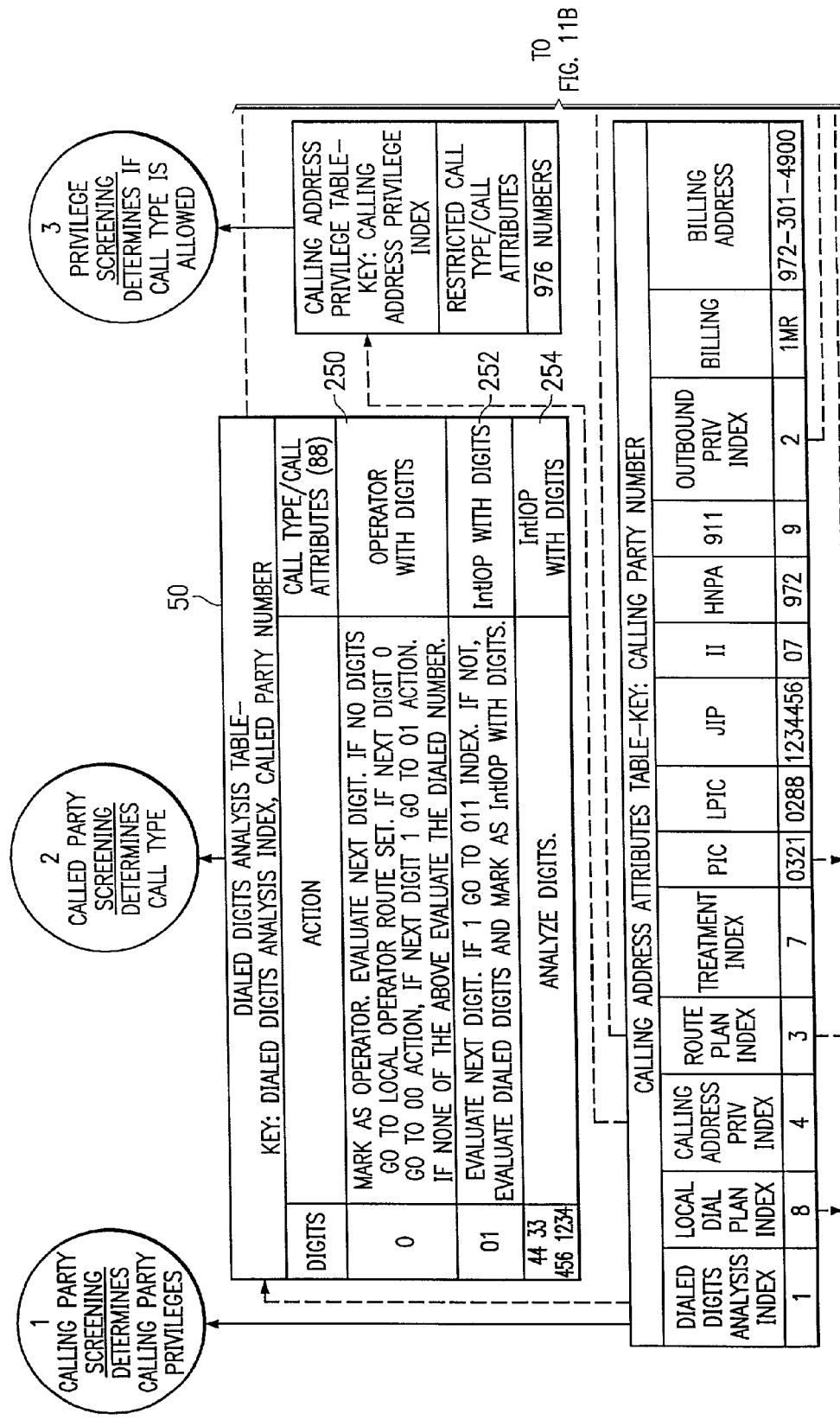
FIGS. 11A and 11B are schematic drawings showing tables and steps associated with the call control engine of FIG. 2A processing an international operator with digits dialed service request originating from the PSTN of FIG. 1 for termination in the IP network of FIG. 1.
Figure 11B:
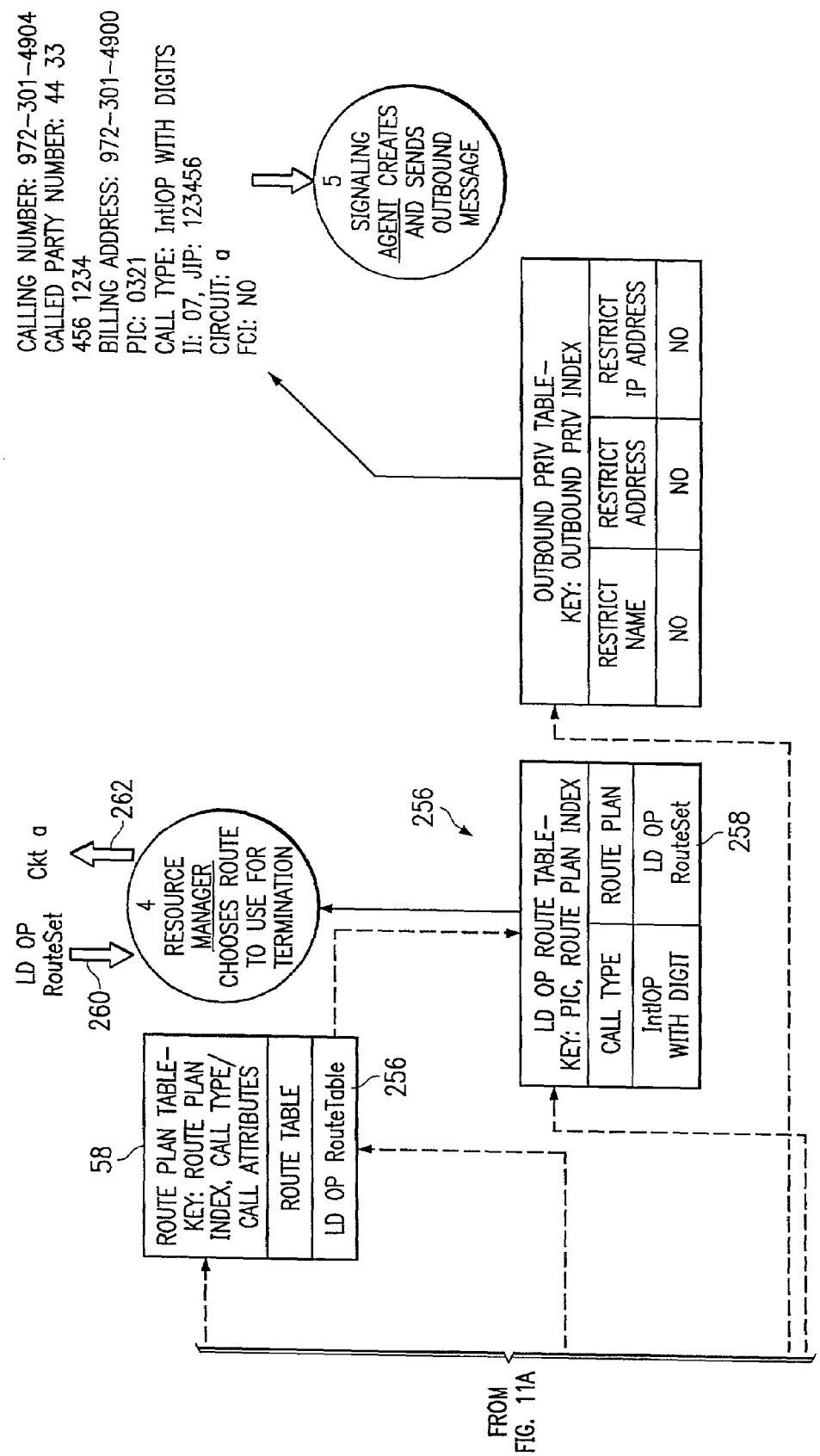

FIG. 11 are schematic diagrams showing tables and steps associated with processing an international operator with digits dialed request. FIGS. 11A and B show call processing for an international operator with digits call, such as for example, "0144334561234." Based on the dialed digit "0" call control engine 34 determines that the call type 88 is an operator with digits call. This is indicated by reference numeral 250. Based on the next two digits "01" call control engine 34 determines that the call type 88 is additionally an international operator call with digits. This is indicated by reference numeral 252. The next eleven digits "44334561234" are used when the call is routed to the operator, as designated by reference numeral 254. Based upon these call type and attributes 88, call control engine 34 determines from route plan table 58 an appropriate list table 256, which in turn specifies an appropriate route set 258. Route set 258 is provided to resource manager 28 as indicated by reference numeral 260, and resource manager 28 selects an appropriate circuit, as noted by reference numeral 262. Call processing from this point continues as described above.

Figure 12A:
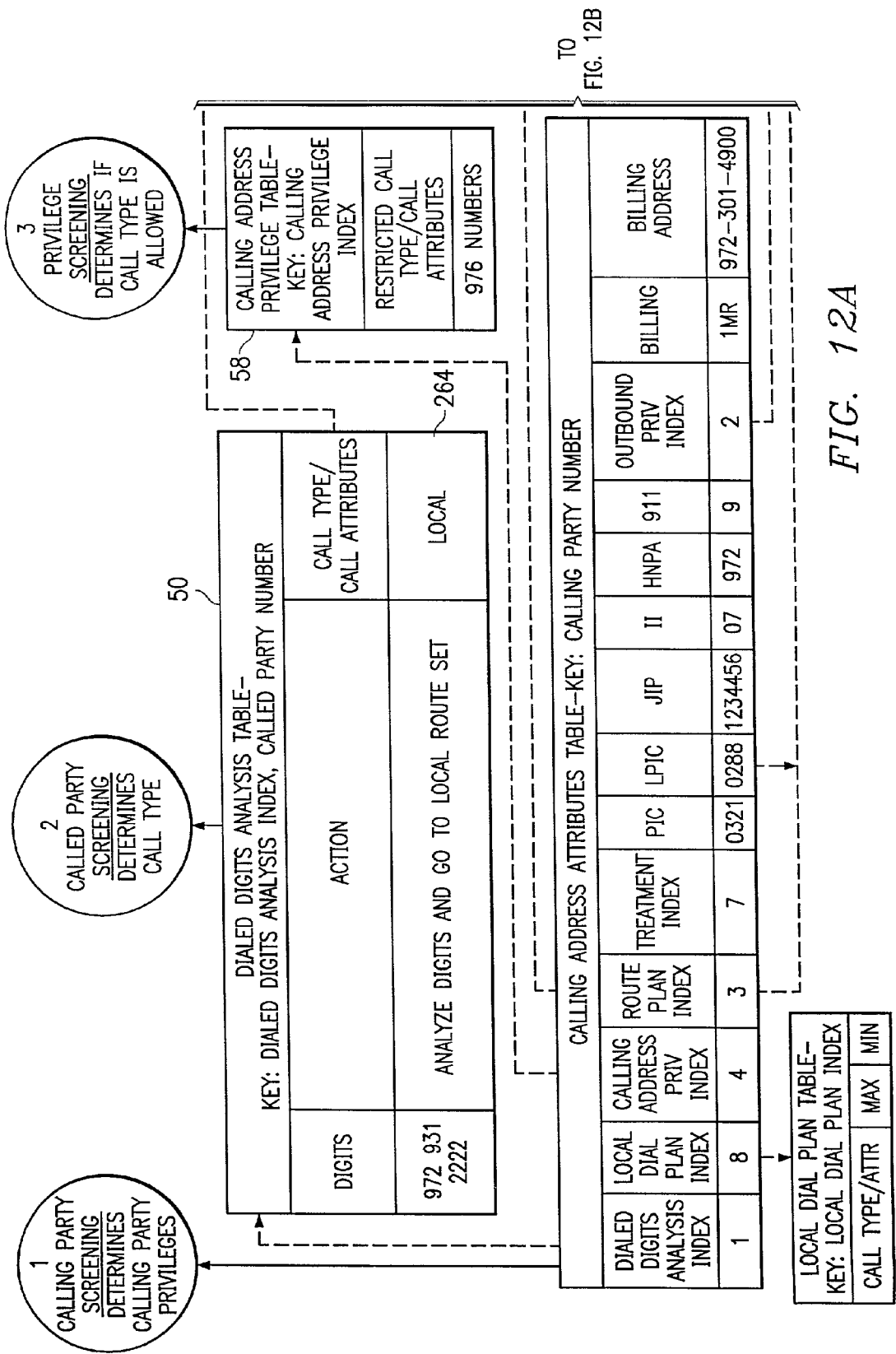
FIGS. 12A and 12B are schematic drawings showing tables and steps associated with the call control engine of FIG. 2A processing local call service request originating from the PSTN of FIG. 1 for termination in the IP network of FIG. 1.
Figure 12B:
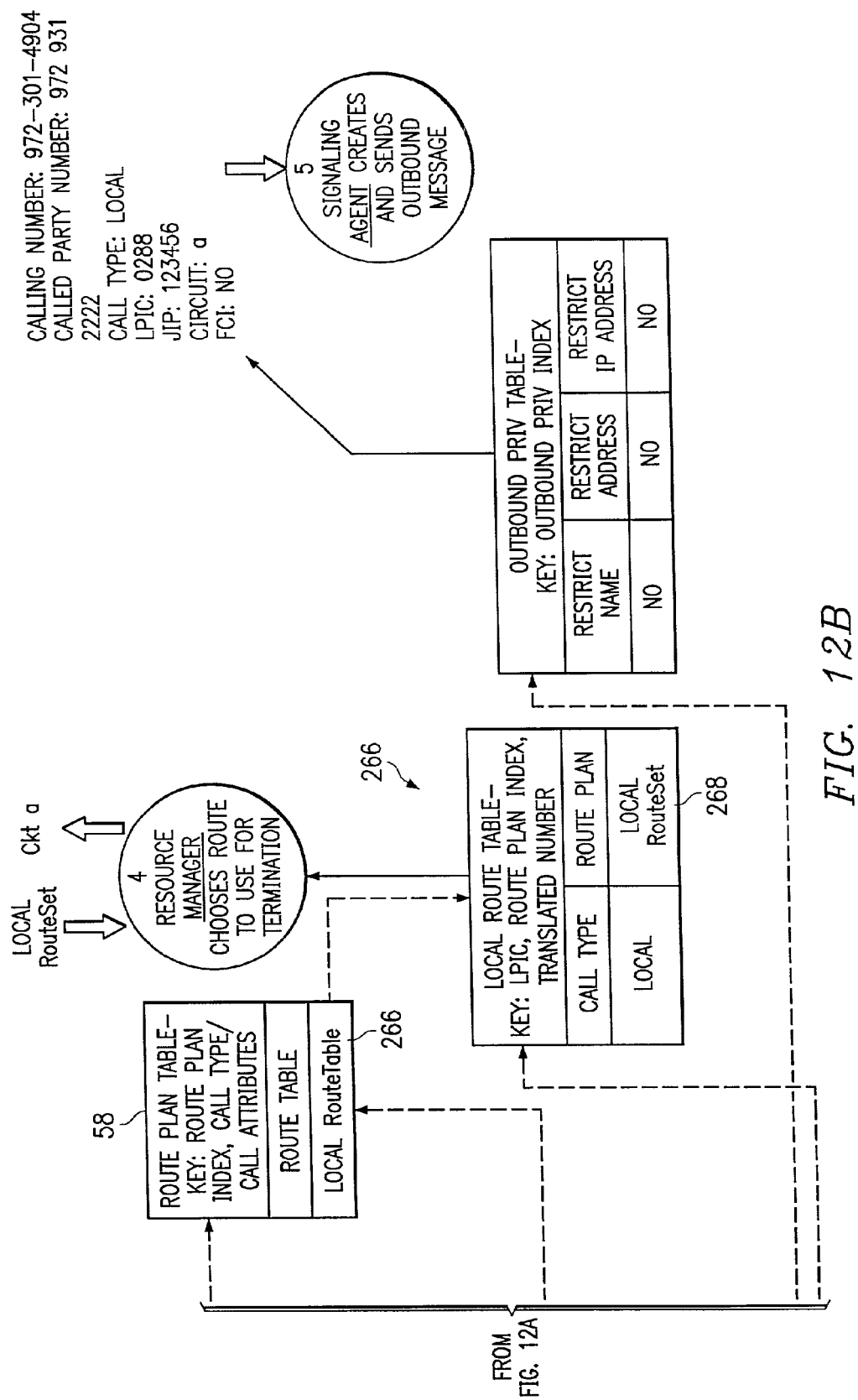

FIGS. 12A and 12B are schematic diagrams showing tables and steps associated with processing a local call. FIGS. 12A and 12B illustrate call processing for a local call based on the dialed digits "9729312222." Call control engine 34 determines from dialed digits analysis table 50 that the call type 88 is a local call as denoted by reference numeral 264. Based on this call type 88, call control engine 34 selects from route plan table 58 an appropriate route list table 266, which in this case has a title of "Local Route Table." Call control engine 34 selects from route list table 266 a route set 268. Route set 268 is utilized by resource manager 28 to select an appropriate circuit, as described above.

Figure 13A:
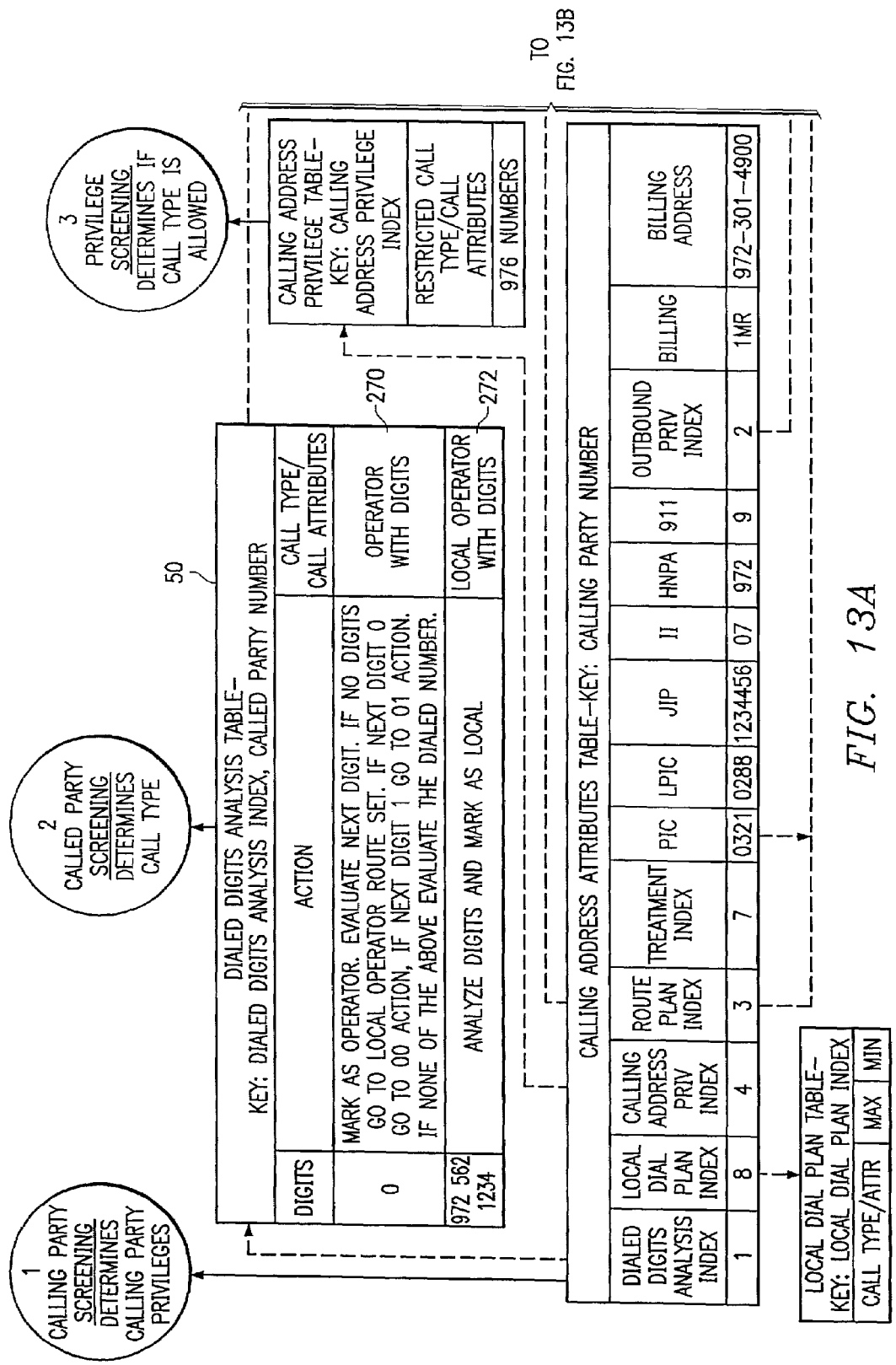
FIGS. 13A and 13B are schematic drawings showing tables and steps associated with the call control engine of FIG. 2A processing a local operator with digits service request originating from the PSTN of FIG. 1 for termination in the IP network of FIG. 1.
Figure 13B:
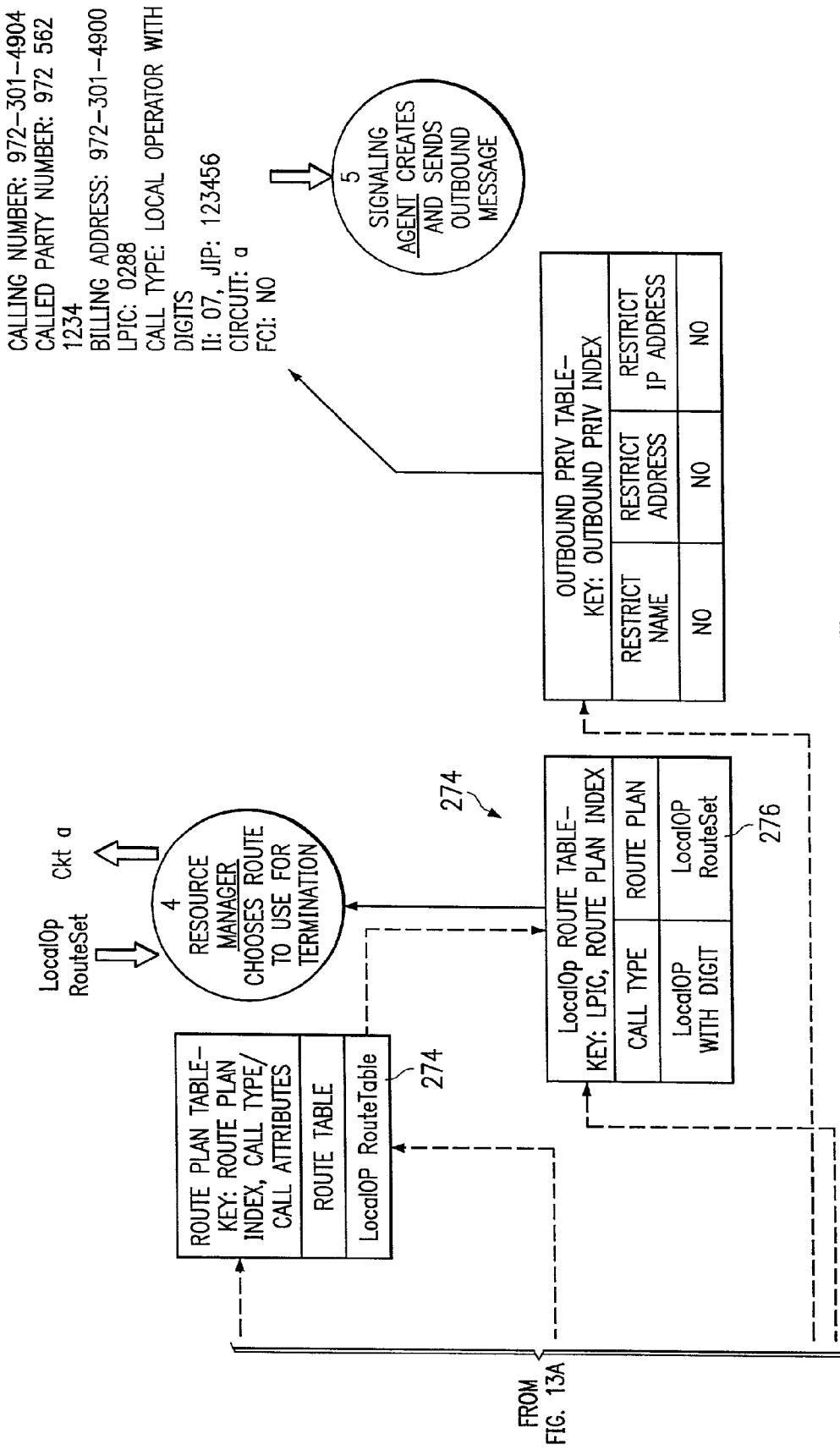

FIGS. 13A and 13B are schematic diagrams showing tables and steps associated with processing a local operator with digits request. FIGS. 13A and 13B illustrate call processing for a local operator with digit call, such as for example, "09725621234." Based on the dialed digit "0" call control engine 34 determines from dialed digits analysis table 50 that the call type is an operator with digits call, as denoted by reference numeral 270. Call control engine 34 further specifies that the call type and attributes 88 is a local operator with digits telephone call, as denoted by reference numeral 272, so the call is routed to a local operator. Based on the call type and attribute 88, as well as route plan index 116, call control engine 34 selects an appropriate route list table 274, which in this case is "LocalOP Route Table." Route list table 274 specifies a route set 276, which in this case has a title of "LocalOP Route Set." Call processing continues as described above.

Figure 14A:
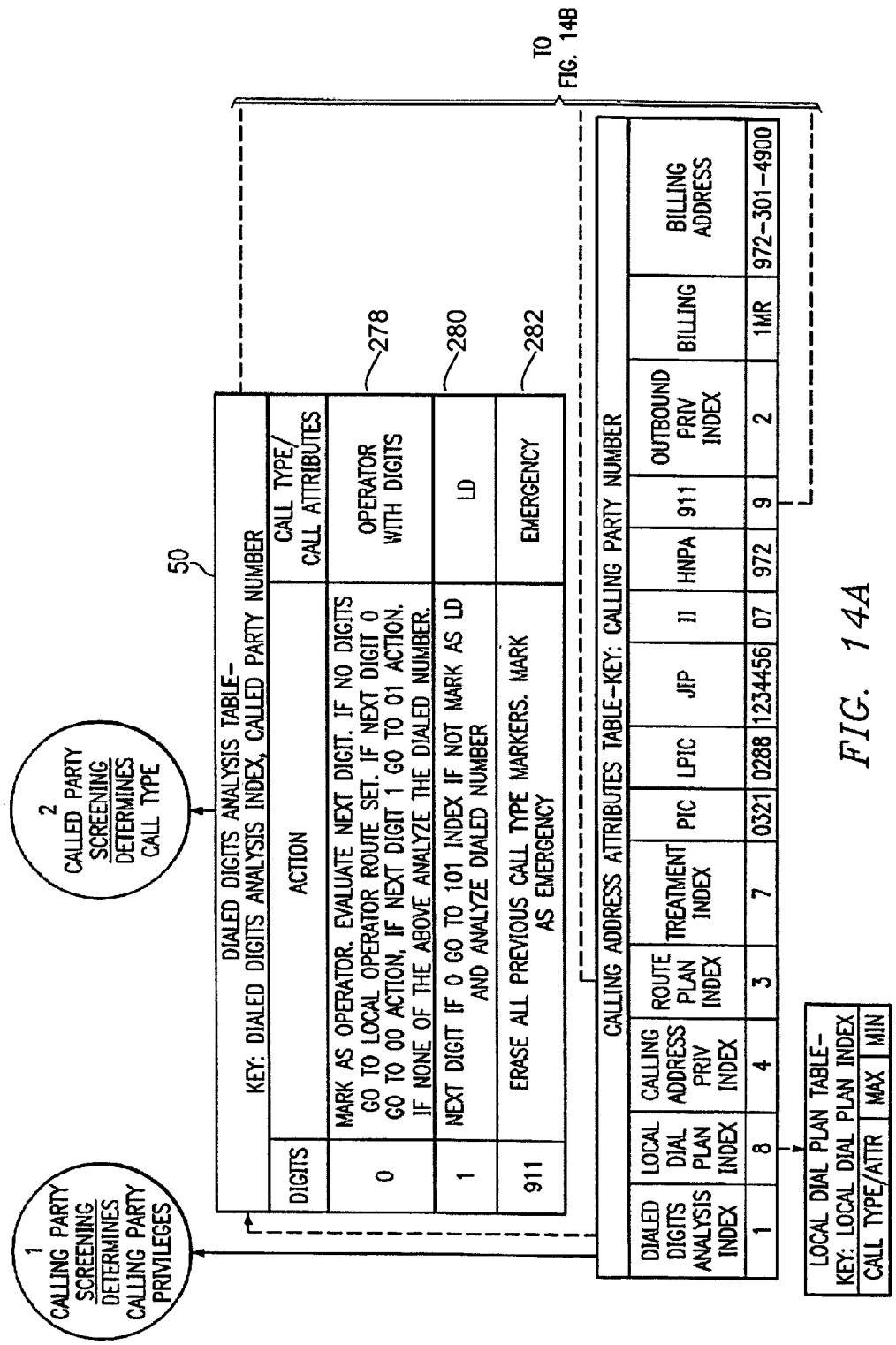
FIGS. 14A and 14B are schematic drawings showing tables and steps associated with the call control engine of FIG. 2A processing an emergency service request originating from the PSTN of FIG. 1 for termination in the IP network of FIG. 1.
Figure 14B:
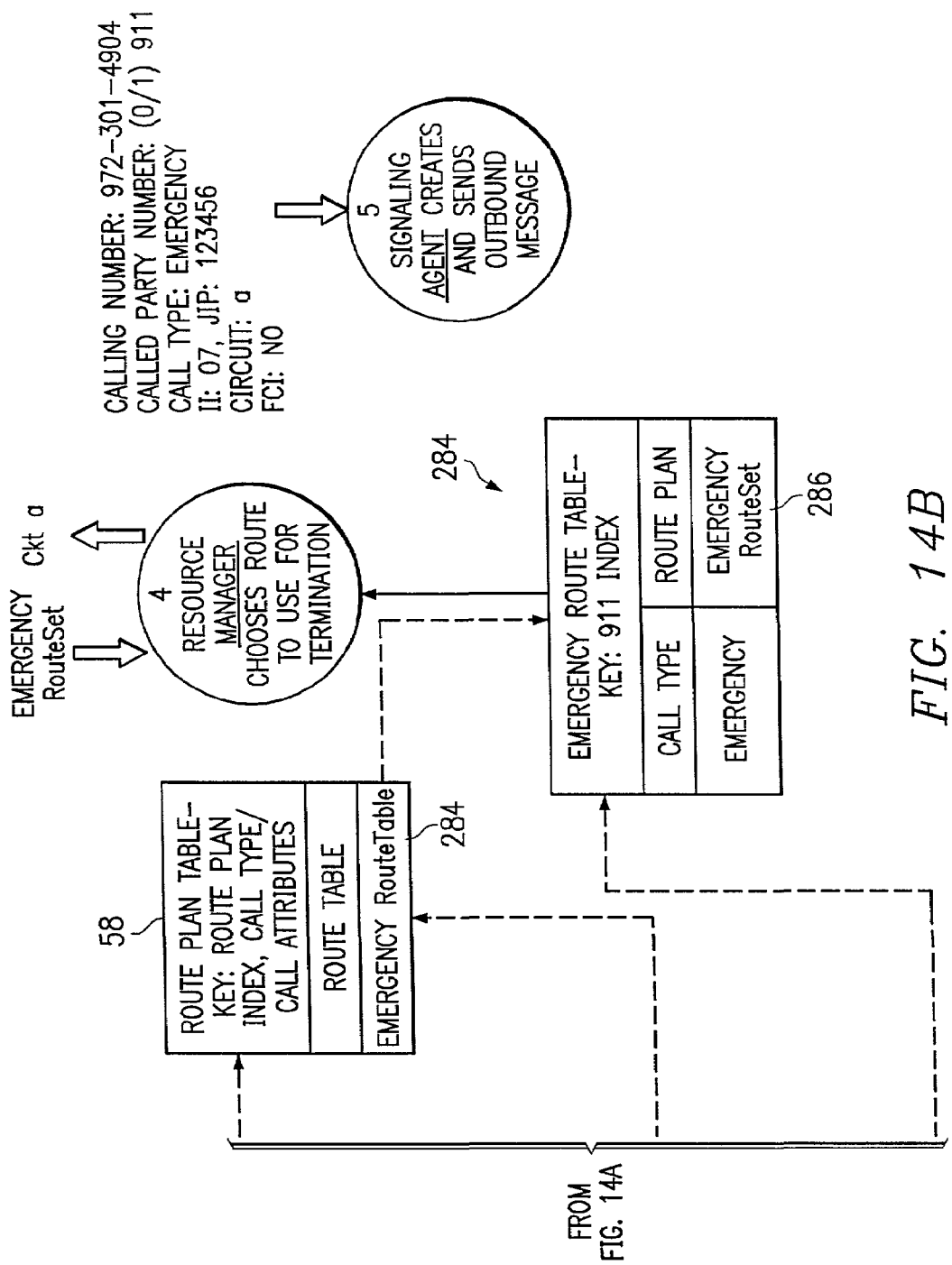

FIGS. 14A and 14B are schematic diagrams showing tables and steps associated with processing an emergency request. FIGS. 14A and B illustrate call processing for emergency calls, such as for example, "0911, "1911," and "911." Based on the dialed digit "0" the call type is determined to be an operator with digits call, as denoted by reference numeral 278. However, if the call initiated with a "1" digit, call control engine 34 will identify from dialed digits analysis table 50 that the call type 88 is a long distance call as denoted by reference numeral 280. However, regardless of whether the first digit was "0" or "1" or "911" once the "911" digits are analyzed, call control engine 34 determines that the call is an emergency call as denoted by reference numeral 282. Based on call type 88 of an emergency, call control engine 34 determines from route plan table 58 that the appropriate route list table 284 has a title "emergency route table." From this route table 284, an emergency route set 286 is selected, and call processing continues as described above.

Figure 15:
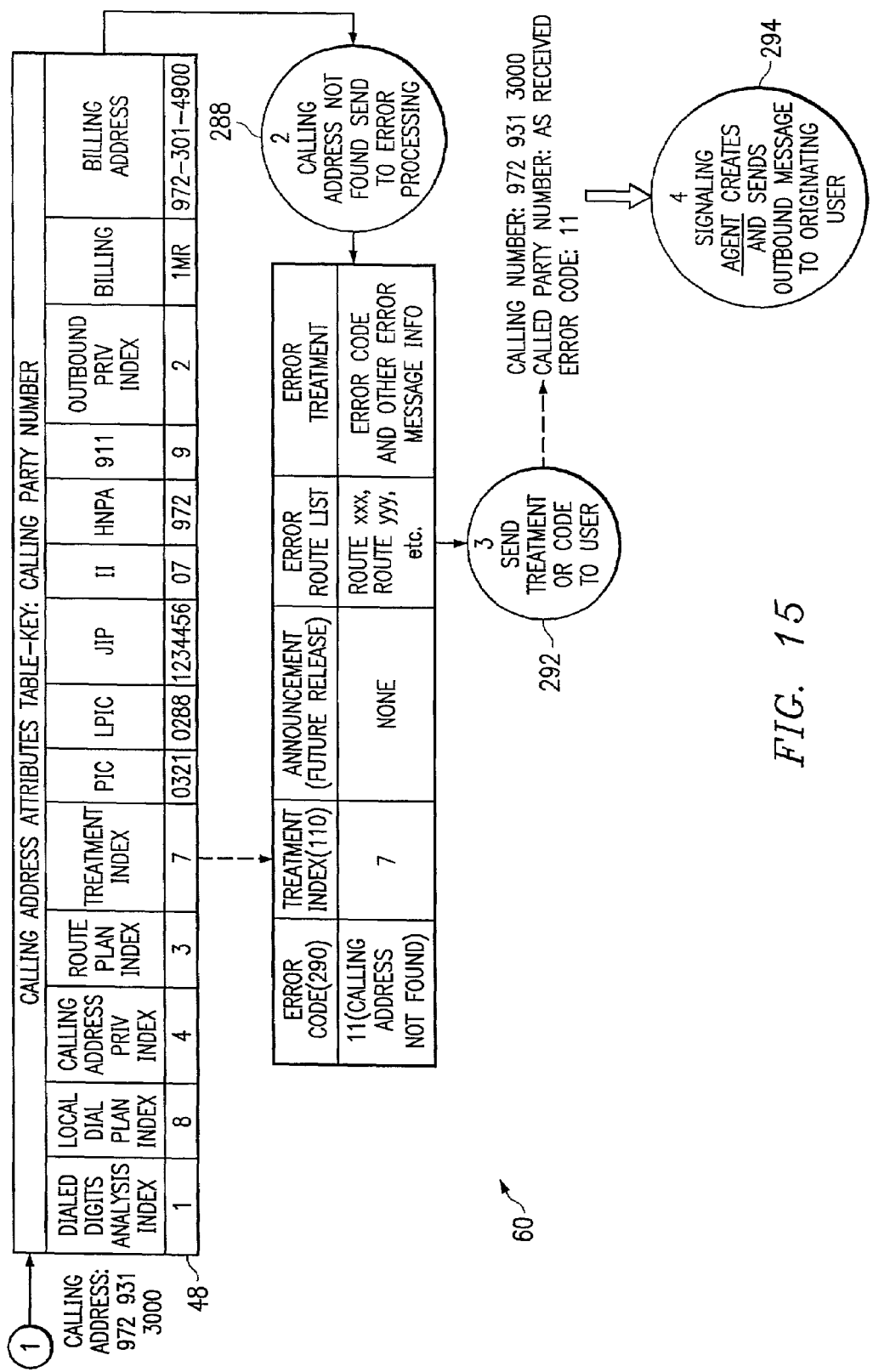
FIG. 15 is a schematic drawing showing tables and steps associated with the call control engine of FIG. 2A processing a calling address not found error.

FIG. 15 are schematic diagrams showing tables and steps associated with processing an error calling address not found request. FIG. 15 illustrates call processing for an error condition in which the calling address is not found. In this example, the calling address that is not found is "972-931-3000." At step 288, call control engine 34 does not find the calling address attribute table 48; therefore error processing is invoked at step 288. According to this embodiment, call control engine 34 generates an error "11" indicating a calling address is not found. In addition, by default, treatment index "7" is specified for a default calling address. Based upon error code 290 and treatment index 118 an error route list is selected by call control engine 34 and the treatment of the call is sent back to the original user at step 394.

TABLE 1

| Trunk Attributes Table: | | | | | |
|---|---|---|---|---|---|
| Trunk | Subscriber Translation Index | SIP Proxy Routing Index | Call Attribute/ Call Type | Treatment Index | CLLI |
| 2578 | 1 | | Inter-LATA Toll | 1 | |
| 6544 | 2 | 1 | | 2 | |

Key: Trunk (1–4 digits).
Subscriber Translation Table Index is 1–3 digits.
Additional Call Attribute columns may be added as the need arises.
The CLLI is based on GR317, GR444.

TABLE 2

Subscriber Translation Table:
Please note that the numbers may be in domestic or international format and therefore consider both scenarios.

| Subscriber Index | E.164 | Name | SIP URL | Domain Name | IP Address | E-mail Address | Attributes |
|---|---|---|---|---|---|---|---|
| 1 | 1 972-301-4940 | Forest Gump | Forest.Gump@sgw1.tti.com | Sgw1.tti.com | 10.10.49.2 | Forest.Gump@ttimail.com | Provides ringback |
| 2 | 44 10 555 4444 | Sean Connery | | | | | |
| 3 | | Goldie Hawn | Goldie.hawn@sgw2.aol.com | Sgw2.aol.com | 100.100.100.2 | goldie@aol.com | |

Key:
Subscriber Translation index (1–3 digits).
Name is alphanumeric
SIP URL is based on IETF URL format, alphanumeric
IP Address is standard IP address format, digits, XXX.XXX.XXX.XXX
E-mail address is based on IETF URL format, alphanumeric
E.164 is digits, in domestic or international format, range 0 to 32
Attributes is alphanumeric.

TABLE 3

SIP Proxy Routing Table:

| SIP Proxy Routing Index | SIP Domain | SIP CMS Proxy |
|---|---|---|
| 1 | Tti.com | sgw1.tti.com |
| 1 | Att.com | sgw1.tti.com |
| 2 | mci.com | sgw2.tti.com |

TABLE 3-continued

SIP Proxy Routing Table:

| SIP Proxy Routing Index | SIP Domain | SIP CMS Proxy |
|---|---|---|
| ... | ... | ... |
| ... | ... | ... |

Key: SIP Proxy Routing Index (1–3 digits).
This table provides what proxy to use for which domains. i.e., if a tti.com appears in the "To:" address of the SIP then the call is sent to sgw1.tti.com.

TABLE 4

Calling Address Attributes:

| Calling Address | Dialed Digits Analysis Index | Local Dial Plan Index | Calling Address Privilege Index | Route Plan Index | Treatment Index | PIC | LPIC | Jurisdiction Information | II Digit | HNPA | 911 | Outbound Privacy Index | Billing | Billing Address |
|---|---|---|---|---|---|---|---|---|---|---|---|---|---|---|
| 1 972 301-4940 | 8 | 7 | 4 | 8 | 1 | 0321 | 0288 | 972907 | 00 | 972 | 9 | 2 | 1MR | 972-301-4900 |
| 1 972-678-8080 | 3 | 12 | 2 | 3 | 2 | 0321 | 0288 | 972301 | 63 | 910 | 9 | 1 | 1FR | |
| Bugs.Bunny@ttimail.com | 3 | 1 | 4 | 3 | 3 | 0321 | 0288 | 214555 | 07 | 972 | 9 | 2 | 1DS | |

Key: Calling Address.
Calling Address may be alphanumeric, may be in URL or e-mail format, or may be digits in E.164 or NPA-NXX-XXXX format.
Dialed Digit Analysis Index 1–3 digits—Pointer to the Dialed Digit Analysis Table. I.e., Dialed Digit Analysis is based on the calling party's subscriber profile.
Local Dial Plan Index is 1–3 digits—Pointer to the Local Dial Plan Table, which identifies that based on the calling party, what does the user's local dial plan look like, i.e., for each particular call type what is the format of the number, max and min number of digits.
Calling Address Privilege Index 1–3 digits—Pointer to the Calling Address Privilege Table, which identifies what are the call type restrictions for a particular Calling Party.
Route Plan index is a digit 1–3 digits—The Route Plan Index, which is based on the Calling Party, along with other Keys is provided to the Route Table identified by the Route Plan Table, to specify which route set to use based on the calling party's profile (i.e., Route Plan index) and other factors as the case may be, such as Call Type, LPIC, PIC, etc.
Treatment Index - 1–3 digits—Pointer to the Error Table, used to decide on what type of treatment to use based on a particular error condition and the calling address.
PIC is 1–5 digits—This is the Calling User's Long Distance Carrier ID code.
LPIC is 1–5 digits—This is the Calling User's Local Service Provider's Carrier ID Code.
Jurisdiction information is 6 digits—The JIP identifies the switch from which the call originates, and can be recorded to identify that switch.
II digits is 2 digits—The II digits get populated in the OLI parameter of the IAM.
HNPA is 3 digits—HNPA is the Home NPA, which defines the NPA for the calling party, if there is a call dialed without an NPA it is assumed that it is in the same NPA and therefore the CC will use the HNPA to populate NPA in front of NXX-XXXX.
911 index is 1 digit—Pointer to the 911 route table to identify what 911 route set to use for the Calling User.
Outbound privacy index is 1 digit—Pointer to the Outbound Privacy Table, which defines if the Calling User is pre-subscribed to Caller Name and/or number privacy.
Billing is 3 digits—To be used at a later date identifies that billing rate to use for the Calling User.

TABLE 4-continued

Calling Address Attributes:

| Calling Address | Dialed Digits Analysis Index | Local Dial Plan Index | Calling Address Privilege Index | Route Plan Index | Treatment Index | PIC | LPIC | Jurisdiction Information | II Digit | HNPA | 911 | Outbound Privacy Index | Billing | Billing Address |
|---|---|---|---|---|---|---|---|---|---|---|---|---|---|---|

Billing Address—may be alphanumeric, may be in URL or e-mail format, or may be digits in E.164 or NPA-NXX-XXXX format. If digits, the limit is 0–32 digits. On the other hand, if the Calling Address is alphanumeric, there is not limit but must conform to the standard URL format. This is the address that the call is billed to, e.g., the PBX number.
The PIC, LPIC, Jurisdiction Information, II Digit, HNPA, Billing, Billing Index are not indexes, they are actual values.

TABLE 5

Dialed Digit Analysis Table:

The called number may go through this table several times to:
Identify Call Type
Identify Call Attribute (CLIP, CLIR, etc.)
Delete/Add digits
Point back into the table for further analysis OR point to a different table for analysis
End digit analysis
This table does not provide some examples of Call Types and Call Attributes and actions.

| Dialed Digit Analysis Index | Digits | Action | Call Type/Call Attribute |
|---|---|---|---|
| 1 | 0+ | Next digit if 0 go to 3 if 1 go to 4 if non of the above mark as operator and analyze the NPA-NXX | OSPS |
| 1 | 0− | Mark as operator and Go to LD Opr Route Select | Local Operator W/out Digits |
| 2 | 00 | Mark as LD operator and Go to LD Opr Route Select | LD Operator W/out Digits |
| 2 | 01+ | Next digit if 1 go to 5 if not mark as LD operator and analyze the NPA-NXX | LD Operator International |
| 3 | 011 | Mark as International, analyze the Next Digits go to LD InterLATA Route select | International |
| 4 | 1+ | Next digit if 0 go to 7 if not mark as LD and analyze the NPA-NXX | LD |
| 5 | 101+ | Mark as CAC call and analyze service number | CAC |
| 6 | *XX | Analyze XX. Go to Star Service Table for specific processing instructions for that XX. | Star Service |
| 7 | N11 | Go to Table N11 | Information |
| 8 | 900 | Go to Table 900 | Premium SAC |
| 8 | 8XX | Go to Table SAC | Toll Free |
| 9 | 976 | Go to Table 976 | 976 Calls |
| 10 | NPA-NXX-XXXX | Analyze digits go to route select | Local, LD Intra LATA, LD Inter LATA |
| 11 | NXX-XXX | Analyze digits go to route select | Local |
| 12 | NP | Analyze digits go to route select | E.164 International |

Key: Dialed Digits Analysis Index and Dialed Digits.
Star Service Table describes what each * service logic should be, please note at end of this table the logic is going to refer the number back to Digit Analysis table to analyze the digits received after *XX code.
N11 Table describes logic for N11 calls
900 Table described logic for 900 calls
SAC table described logic for toll free calls
976 Table described logic for 976 calls
Digits is 0 to 32 digits.

Action is what needs to happen next.
Call Type/Call Attribute is alphanumeric and it assigns a Call Type or a Call Attribute to the call.

TABLE 6

Local Dial Plan Table: This table provides some examples of Call Types and Call Attributes.

| Call Type/Call Attribute | Maximum | Minimum |
|---|---|---|
| Local | 11 | 1 |
| Operator | 1 | 1 |

Key: Local Dial Plan Index (1–3 digits).
Call Type/Call Attribute is alphanumeric
Maximum is 1–2 digits
Minimum is 1–2 digits

TABLE 7

Calling Address Privilege Table:
(The number of columns is dependent on the plan defined for each index)

| Calling Address Privilege Index | Restricted Calling Area | Restricted Calling Area | Restricted Calling Area |
|---|---|---|---|
| 1 | 976 Numbers | International | |
| 2 | Operator | 900 Numbers | Information |
| 3 | *XX | CAC calls | International |
| 4 | CAC calls | Toll Free | |
| 5 | International | Operator | |

Key: Calling Address Privilege Index (1–3 digits).
Restricted Calling Area is alphanumeric. It lists the call types being restricted.

TABLE 8

Outbound Privacy Table:

| Outbound Privacy Index | Restrict Name | Restrict Address | Restrict IP Address |
|---|---|---|---|
| 1 | Y | Y | Y |
| 2 | Y | | |
| 3 | | Y | Y |

Key: Outbound Privacy Index (1–3 digits).
Restrict Name is Boolean
Restrict Address is Boolean
Restrict IP Address is Boolean

TABLE 9

Route Plan Table:
(This table contains example options.)

| Route Plan Index | Call Type/Call Attribute | Route Table |
|---|---|---|
| 1 | International, LD InterLATA, . . . | LD InterLATA Route Table |
| 2 | LD IntraLATA | IntraLATA Route Table |
| 1 | International Operator LD Operator . . . | International Op Route |
| 3 | FreeSAC | FreeSAC Route |
| 3 | PremSAC | Premium SAC Route |
| 4 | Local, . . . | Local Route |
| 4 | Local Operator, . . . | Local OP Route |
| 1 | Emergency | Emergency Route |

Key: Route Plan Index, Call Type/Call Attribute (alphanumeric).
Please note that not all Call Types/Call Attributes and route table options are listed.
Based on the Route Plan Index, which is indexed off of the Calling Party Number, the call type, and call attribute, it is determined which Route Set Table to access.

TABLE 10

LD InterLATA TABLE:

| PIC | Route Plan Index | Route Option 1 | Route Option 2 | Route Option 3 |
|---|---|---|---|---|
| 0321 | 1 | Route Set X | Route Set Y | Treatment Option |
| 0321 | 1 | . | . | . |
| 0321 | 1 | | | |
| . | | | | |
| . | | | | |
| 0322 | 2 | | | |
| 0322 | 2 | | | |
| 0322 | 2 | | | |

Key: PIC, Route Plan Index.
*For tables identifying routes for Local Calls instead of PIC use LPIC.
PIC and LPIC are 4 digits
Route Plan index is 1–3 digits
Route Option provides the route set name. For each Route plan index and PIC/LPIC there could be many different route set options.
PLEASE NOTE: There will be up to 8 trunk groups and/or treatments supported with each route set.

TABLE 11

Error Table:

| Error Code | Treatment Index | Announcement (future release) | Route Advance | Release with Cause |
|---|---|---|---|---|
| 11 (Calling Address Not Found) | 1 | None | Route xxx, Route xxx, etc. | None |
| 14 | 1 | Announcement Server X, Announcement Code 1234 | None | None |

Key: Error Index (1–3 digits), and error code (1–5 digits).
Please note that the error code may be the ISUP Release Cause Value, the SIP Error Code value or internal Error Code values.
Announcement will at least contain the name of the announcement server to use and the announcement code to be played.
Error Route List will contain a list of trunks from which the Resource Manager can choose to route the call.
Error Treatment will contain the information necessary to send to Termination SA so that Termination SA can compose and send error treatment back to the caller.

Figure 16:
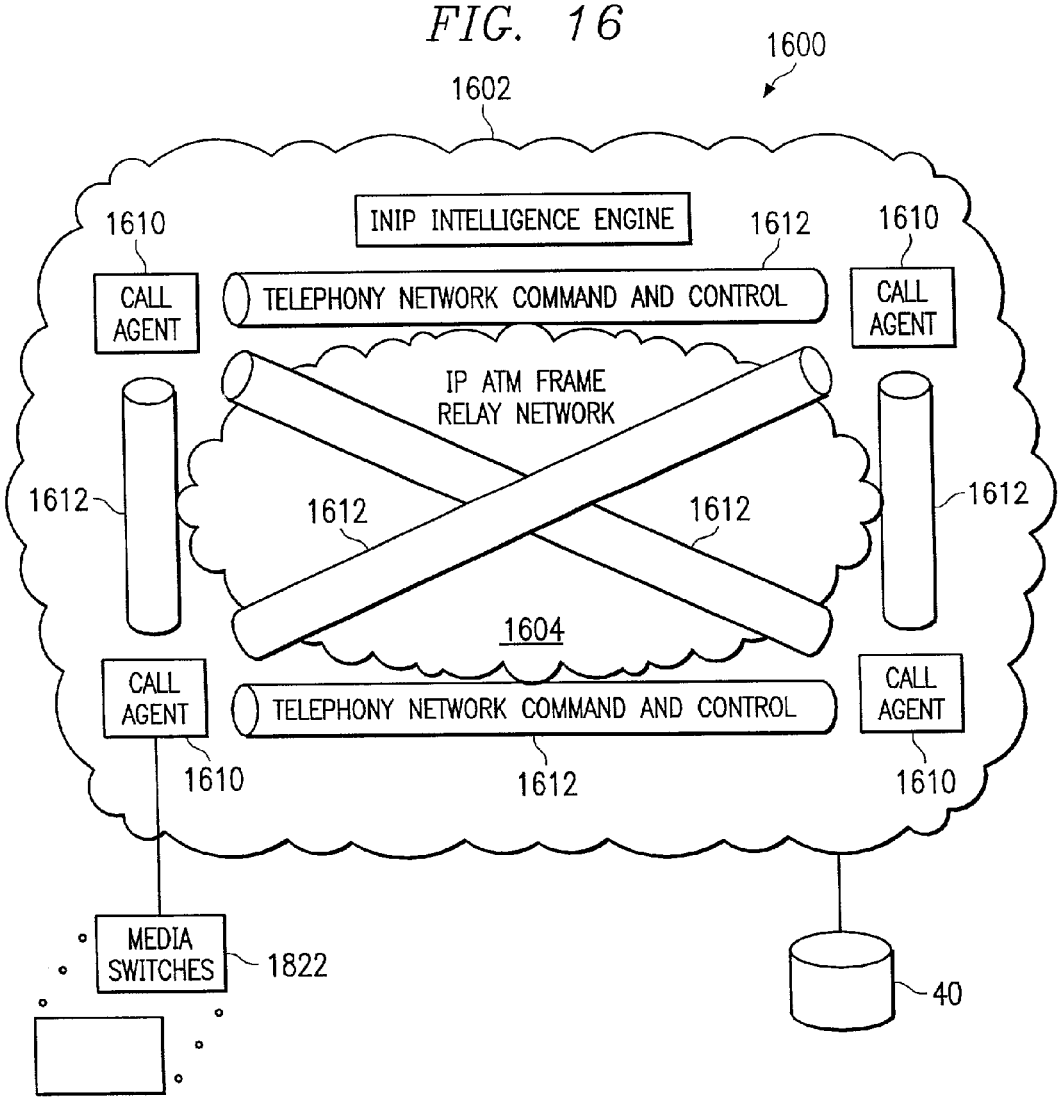
FIG. 16 is a block diagram of one embodiment of a network topology based on the intelligence engine of the present invention.

As discussed in conjunction with FIGS. 2A–15, intelligence engine 36 is operable to perform call routing, verification and authentication functions among others, in response to a state-driven call event. Referring now to FIG. 16, a block diagram of one embodiment of a network topology based on the intelligence engine of the present invention is shown. Network 1600 includes a plurality of call agents 1610 that are coupled by a plurality of command and control tunnels 1612. Call agents 1610 and command and control tunnels 1612 are coupled to at least one packet-enabled network that may be represented by network cloud 1604. For example, network cloud 1604 may include, but is not limited to, networks such as IP, ATM, and frame relay networks that utilize packet communications. Command and control tunnels 1612 each represent control by intelligence layer 1602 over dedicated IP tunnels that may be used for data transfer between media switches 1822 that are controlled by call agents 1610. A plurality of command and control tunnels 1612 are provided for redundancy in case of failure or malfunction.

Each call agent 1610 is coupled to at least one media switch 1822, which may utilize one of a variety of protocols, including but not limited to, SS7, SIP, and H.XXX protocols such as H.323. Alternatively or in addition, each call agent 1610 may also be coupled to a variety of wireless protocols such as AMPS, TDMA, CDMA, and wireless 3G. Intelligence layer 1602 graphically illustrates a flattened virtual layer of intelligence and control that may be used to access database 40 to complete call events within network 1600 using a single packet stream. Intelligence cloud 1600 also provides control in case of network congestion or failure.

Figure 17:
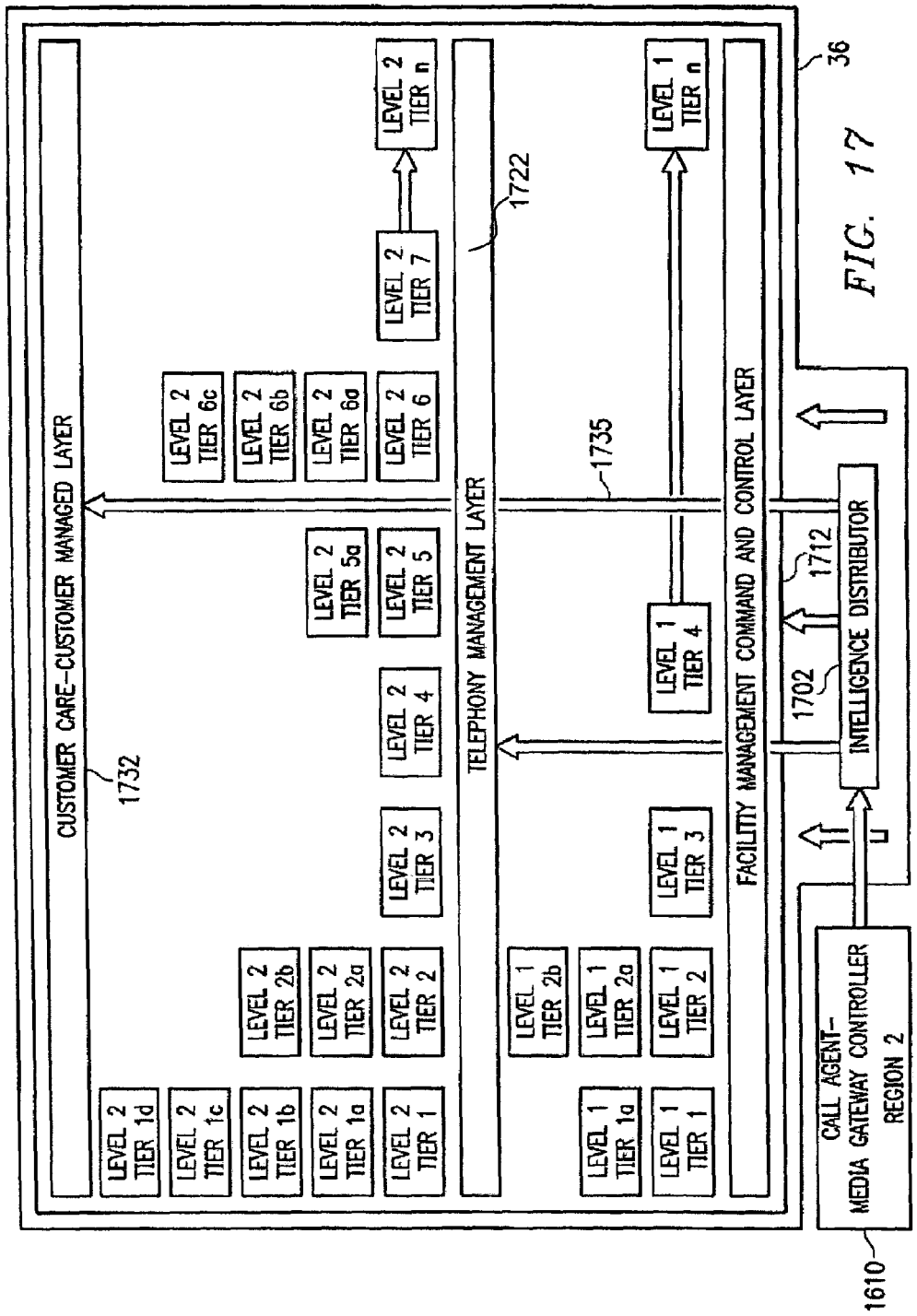
FIG. 17 is a graphical illustration of an embodiment of the intelligence engine constructed according to the teachings of the present invention.

FIG. 17 is a graphical illustration of an embodiment of an intelligence engine constructed according to the teachings of the present invention. Intelligence engine 36 includes an intelligence distributor 1702, facility management command and control layer 1712, telephony management layer 1722, and customer managed layer 1732. In operation, intelligence engine 36 is operable to perform functions related to call control by determining, among other things, what route the call will take, and in doing so also communicates with database 40 as discussed above. FIG. 17 illustrates portions of database 40 that may be accessed when intelligence engine 36 performs call control functions. By collapsing the information required to perform call control-related functions into a centrally-accessible database 40, intelligence engine 36 is able to improve efficiency and increase scalability of a network.

For example, intelligence engine 36 allows equalizing or normalizing signals from current wireline and wireless networks such as GSM, TDMA, and others. Such an advantage may eliminate a "tiering" effect by exchanging data between one or more protocols in IP, rather than by intermachine trunking switching through a plurality of switches, or "dipping down" through a variety of circuits. Intelligence engine 36 may control end-to-end transport of the call through integration of the network intelligence between an origination and a termination point. Moreover, access to a centralized database 40 may enable services such as new subscriber management, and may lessen the overhead required to maintain and update redundant databases. Such an advantage also may tie up fewer physical circuits in a network. Use of an intelligence engine 36 may also be advantageous because it may assign an origination and termination port through an IP network, thus reducing the number of ports required to verify, authenticate, and/or route information from origination to termination, and providing scalability for future expansion.

Distributor 1702 may receive call primitives or digits (such as 9723012200) from one or more call agents 1610, which may be, for example, a media gateway controller of a region that includes a plurality of media switches. For example, regions may be partitioned by area codes, so that a call agent for a first region may control media switches for an area code such as 212, and a call agent for a second region may control a plurality of media switches four an area code such as 214. Distributor 1702 may send one or more signals such as requests to facility command and control layer 1712, telephony management layer 1722, and/or customer-managed layer 1732.

Telephony management layer 1722 may access portions of database 40 that may store ANI verification, HLR/VLR, Billing and CDR, Sales, MIS, and other information. Intelligence engine 36 may access database information using a variety of methods, including object oriented, relational, and/or hierarchical database techniques, flat files, tables or any other structure suitable for storing and/or retrieving the information desired during call processing and/or data processing events.

In one embodiment of the invention, telephony management layer 1722 may access a plurality of tables. These tables may reside locally and/or may be accessed directly from a single or multiple databases 40. FIG. 17 illustrates these tables using the terms "tiers" and "levels" for generality. For example, facility management command and control layer 1712 may access a plurality of Level One tables, Tiers 1-n. Similarly, telephony management layer 1722 may access a plurality of Level Two tables, Tiers 1-n, and customer managed layer 1732 may access a plurality of Level Three tables, Tiers 1-n, to associate billing, accounting and MIS data with a call event. For example, distributor 1702 may send a business request 1735 to customer managed layer 1732, which may then access one or more of the plurality of Level Three tables to associate billing or other data with the call event. Such information may be used for a variety of applications, including billing, auditing, and/or accounting related to call events to or from a subscriber. Each of Level One, Level Two, and Level Three tables may logically be arranged in a hierarchical form, such as illustrated in FIG. 17. Although FIG. 17 illustrates these tables in a hierarchical form, the invention contemplates the use of a variety of logical and/or functional configurations for these tables, depending on the application.

A variety of service environments may also be included in intelligence engine 36 by using customer managed layer 1732. These services may also be accessed by stateless call control or logic engines that make available a variety of functions and that may reside on a variety of platforms, including those remotely located from intelligence engine 36. For example, an integrated service layer (not explicitly shown) may be used to interface to existing, or legacy systems, such as, but not limited to, billing systems such as AMA and CDR, traffic metering and management systems, and operator service and debit centers that are typically used for voice communications (e.g., credit card). A peripheral service layer may also be used to interface to such existing systems as prepaid processing centers, e-mail, short message service, and voicemail.

In addition, as technology permits, a variety of service events may also be created using logic in intelligence engine 36 that allows an operator such as MCI Worldcom and/or a customer to access a telecommunications network and to use licensed services and/or features. These features and/or services that are available to customers may be set up and/or changed using, for example, an operator service creation engine. In addition, these customers may select and/or request services from a variety of operators using, for example, a customer feature manipulation engine. Such an engine may allow a customer to create its own sub-network, where a customer's platform provides a physical port appearance for a variety of devices such as DSL, DSLAM, cable modems, and a variety of IP-enabled appliances.

Intelligence engine 36 may include logic in these layers, such as additional call control or logic engines, to access additional database entries that may be included to provide information regarding these services. As technology permits, these database entries may be integrated and/or accessible by database 40.

Figure 18:
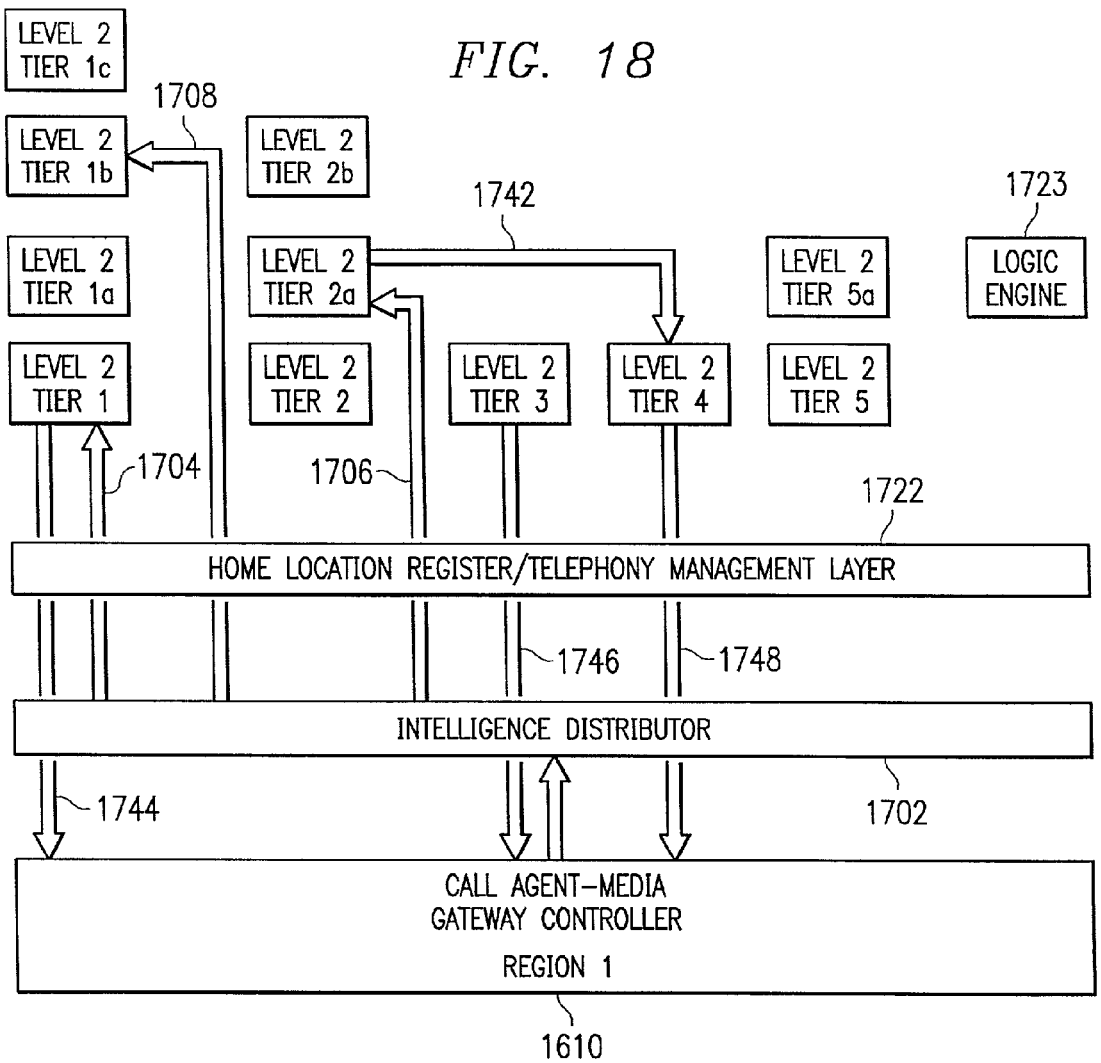
FIG. 18 is a graphical illustration of an embodiment of the operations of an information management layer for processing call events according to the teachings of the present invention.

FIG. 18 is a graphical illustration of an embodiment of the operations of an intelligence engine when processing call events according to the teachings of the present invention. In operation, distributor 1702 is operable to statelessly "tear down" each call. For example, distributor 1702 may receive primitives from call agent 1610, and in response to receiving the primitives may send an originating ANI lookup request 1704 to Level Two, tier One, a routing request 1708 to Level Two, tier 1b, and a terminating ANI request 1706 to Level Two, tier 2a. In response to these requests, a telephony management layer call control or logic engine 1723 performs origination and termination subscriber information lookups and allows the call to be completed. In some cases, telephony management layer call control or logic engine 1723 may also spawn one or more additional requests ("spawned requests") 1742 necessary to complete the call to applicable Level Two tables. For example, a simple wireline residential call event may include the following events which may require subscriber information to be resolved between an originating party and a terminating party: Call primitives are received by distributor 1702, which sends requests 1704, 1706, and 1708 to telephony management layer call control or logic engine 1723. Telephony management layer call control or logic engine 1723 may need to spawn an additional request 1742 to query whether terminating party requests for subscriber information such as a caller number may be provided to an originating party who may request to keep such information confidential, and vice versa. Thus, if a terminating party does not receive a *67 in a call primitive, the terminating party may receive a caller number because the originator is not blocking his caller number. If the terminating party requests the caller's name, the originating party must be queried to find out whether the caller's name may be released to the terminating party. The verified and desired information 1744, 1746, and 1748 is then returned to call agent 1610 to complete the call.

Spawned requests may include, but are not limited to, verification and/or fraud detection requests, originator subscriber information requests, and terminating subscriber information requests. In the wireless arena, additional information may be used for verification and/or fraud detection purposes. For example, in addition to the ANI number, each wireless device such as a cellular phone typically includes an international mobile subscriber identifier (IMSI). In addition to spawned and/or other generated requests in the wireline arena, spawned requests may also include a variety of verification and/or fraud detection methods, including correlation tables.

For example, common database lookups include setting timers for digit collection, digit translation, digit substitution, ANI, ANI restrictions, ANI classifications, and ANI verifications. Adopting a flattened logical, or virtual layer in which, for example, all ANI lookups reside, or from which they may be spawned, may be advantageous because such an implementation may reduce the number of transfers that would otherwise be required by using conventional systems. Each of these tiers, although logically residing in a single location, may also be distributed locally, nationally, or globally. For example, a "212" ANI tier may physically reside in New York, while a "214" ANI tier may physically reside in Dallas. Because each tier may be represented with a logical identifier, such as an IP address, such database lookups may be performed statelessly and without the use of additional circuits. In fact, such a flattened layer may include a variety of additional higher ordered database lookups including information associated with, but not limited to, MIS, CDRs, sales, and billing. For example, conventional systems typically provide cost-sharing between MIS departments, where subscriber information must be transferred back and forth in order to initiate and/or complete a call session. The use of a flattened logical layer may advantageously reduce the overhead that would otherwise be associated with such transfers.

Figure 19:
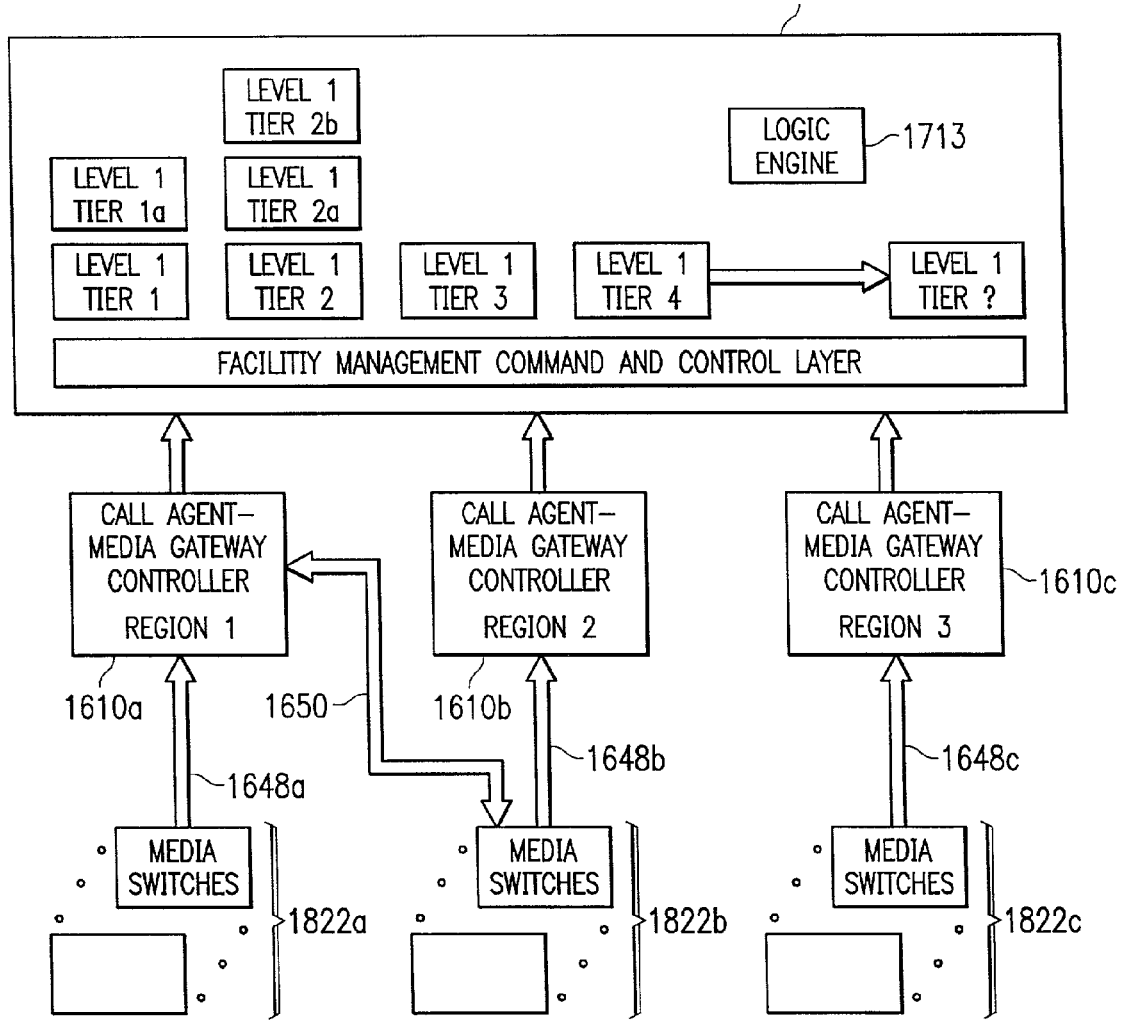
FIG. 19 is a graphical illustration of an embodiment of the operations of a facility management command and control layer according to the teachings of the present invention.

FIG. 19 is a graphical illustration of an embodiment of the operations of a facility management command and control layer according to the teachings of the present invention. FIG. 19 illustrates three media gateway controller call agents 1610a, 1610b, and 1610c operable to communicate with intelligence engine 36 during a plurality of call events. Each media gateway controller graphically represents a region, such as a 212 area code, and is operable to receive a plurality of call events from a plurality of media switches 1822a, 1822b, and 1822c as represented by arrows 1648a, 1648b, and 1648c. Because messages may be "fired off" in an IP network directly to a terminal address, facility management command and control layer call control or logic engine 1713 is operable to update database entries such as dispatch circuit, trunk and group tables. Such updating allows facility management command and control layer call control or logic engine 1713 to logically change the control of a media switch 1822 that is physically controlled by a media gateway controller to another media gateway controller in the event of congestion, failure, or malfunction.

Facility management and control layer call control or logic engine 1713 is operable to receive a signal such as a keepalive or watchdog that indicates whether a malfunction, misfire, congestion, and other network delays may prevent processing of call events through an element such as a media gateway controller. Keep-alive messages typically time out and alert systems when an element is malfunctioning or inoperable. Facility management command and control layer call control or logic engine 1713 may then reconfigure a signal path to be routed from a malfunctional or inoperable call agent 1610a to another control engine 1610b. Facility management command and control layer call control or logic engine 1713 may access dispatch circuit tables, dispatch trunk tables, and dispatch group tables, among others, to logically reroute a terminating switch to follow an originating switch. Thus, as indicated by arrow 1650, should media gateway controller 1610b fail, media switches 1822 that are physically controlled thereby may be rerouted by facility management command and control layer call control or logic engine 1713 to be logically controlled by media gateway controller 1610a. Thus, call events from media switches 1822b are rerouted to call agent 1610a.

Facility management command and control layer call control or logic engine 1713 may provide network management functionality and may increase network reliability. For example, facility management command and control layer call control or logic engine 1713 may provide feedback to a control path such as the SS7 layer to detect whether a route may be busy without seizing a channel to provide this information. This advantage may free up physical switches, thereby increasing network efficiency and network reliability. Similarly, facility management command and control layer call control or logic engine 1713 may also provide catastrophic rerouting and congestion management functionality for a variety of IP time-sensitive data transfers. Such an advantage may manage the continuity of data transfers, important in time-sensitive data systems such as Digital Video Disk (DVD), telephony, or video and video-on-demand systems.

The solution set also comprises network management, billing, and LDAP (lightweight directory access protocol) servers. The software development for the solution set (applications, servers, interfaces, translation and routing, etc.) may use object oriented programming software and techniques, such as CORBA, C++, JAVA, ObjectStore (OODBMS), and VisiBroker (CORBA), and the like.

This invention may be used by data communication companies, voice communication companies, ISPs, CLECs, LECs, long distance providers, wireless communication companies, etc., to interface to other networks such as ATM (asynchronous transfer mode), frame relay, SIP, H.323, Internet, voice, wireless, etc. Although the description of the invention and claims describe specific signaling and transport protocols, it is contemplated that the present invention is designed to interface with and handle emerging and future protocols. In addition, the present invention may be implemented in hardware, software or a combination of hardware and software. It should be noted that many of the block diagrams illustrate functional groupings which may be implemented in alternative embodiments.

Although the present invention has been described in several embodiments, a myriad of changes, variations, alterations, transformations and modifications may be suggested to one skilled in the art, and it is intended that the present invention encompass such changes, variations, alterations, transformations and modifications as fall within the spirit and scope of the appended claims.

What is claimed is:

1. A method for managing a packet network, comprising:
   receiving an indicator signal associated with time-sensitive data traffic in a network, the traffic controlled by a call agent;
   accessing a database entry associated with the call agent in response to the indicator signal; and
   reassigning control of the data traffic from the call agent to a second call agent, wherein reassigning comprises changing the database entry from an IP address associated with the call agent to a second IP address associated with the second call agent.

2. The method of claim 1, wherein the indicator signal comprises a keepalive signal, a congestion indicator, a failure indicator, or a malfunction indicator.

3. The method of claim 1, wherein accessing the database comprises accessing at least one table.

4. The method of claim 1, wherein the database entry comprises dispatch group information, dispatch trunk information, or dispatch control information.

5. The method of claim 1, wherein the data traffic comprises Internet Protocol, voice, video, or multimedia data.

6. The method of claim 1, wherein the data traffic comprises data associated with a call.

7. The method of claim 1, further comprising:
distributing at least a portion of the database across the network.

8. The method of claim 1, further comprising:
receiving, by a distributor layer, state-driven information associated with at least one call between an originator and a termination point from the first or second call agent;
receiving a plurality of stateless requests from the distributor layer; and
accessing a database entry associated with the requests.

9. The method of claim 8, wherein the plurality of requests comprises a routing request, an originating ANI lookup request, or a terminating ANI request.

10. The method of claim 1, further comprising:
spawning at least one request to obtain information associated with an originator and a termination point from the first or second call agent.

11. The method of claim 1, further comprising:
transferring information associated with an originator and a termination point to the first or second call agent.

12. The method of claim 1, further comprising:
receiving a stateless business request from a distributor layer; and
accessing a database entry associated with the business request.

13. The method of claim 12, further comprising:
associating information from the database entry, relating to billing information or accounts information, with the request.

14. The method of claim 1, wherein the database entry comprises information associated with a visitor's location registry, a home location registry, subscriber information, ANI information, or IMSI information.

15. A system for managing a packet network, comprising:
a database; and
a distributor layer operable to:
receive an indicator signal associated with time-sensitive data traffic in a network, the traffic controlled by a call agent;
access an entry in the database associated with the call agent in response to the indicator signal;
reassign control of the data traffic from the call agent to a second call agent; and
change the entry from an IP address associated with the call agent to a second IP address associated with the second call agent.

16. The system of claim 15, wherein the indicator signal comprises a keepalive signal, a congestion indicator, a failure indicator, or a malfunction indicator.

17. The system of claim 15, wherein the entry comprises at least one table.

18. The system of claim 15, wherein the entry comprises dispatch group information, dispatch trunk information, or dispatch control information.

19. The system of claim 15, wherein the data traffic comprises Internet Protocol, voice, video, or multimedia data.

20. The system of claim 15, wherein the data traffic comprises a call.

21. The system of claim 15, wherein the distributor layer is further operable to:
communicate with a first or second call agent, the call agent receiving state-driven information associated with a call between an originator and a termination point.

22. The system of claim 15, wherein the distributor layer is further operable to:
generate a plurality of stateless requests.

23. The system of claim 22, wherein the plurality of requests comprises a routing request, an originating ANI lookup request, or a terminating ANI request.

24. The system of claim 15, further comprising a telephony management layer operable to:
receive a plurality of stateless requests from the distributor layer;
access a database entry associated with the requests, wherein the database entry has associated information; and
send the information to the first or second call agent to route the call.

25. The system of claim 24, wherein the telephony management layer is further operable to:
spawn at least one request to obtain information associated with an originator and a termination point if necessary to route the call.

26. The system of claim 15, wherein the database entry comprises dispatch group information, dispatch trunk information, or dispatch control information.

27. The system of claim 15, further comprising a customer managed layer operable to:
receive a stateless business request from the distributor layer; and
access a database entry associated with the business request.

28. The system of claim 27, further comprising a customer managed layer operable to:
associate information from the database entry, related to billing information or accounts information, with the request.

29. The system of claim 15, wherein the database entry comprises a visitor's location registry, a home location registry, subscriber information, ANI information, or IMSI information.

30. The system of claim 15, wherein at least a portion of the database is distributed across the network.

31. The system of claim 15, wherein the distributor layer is further operable to:
receive state-driven information associated with an originator and a termination point from a first call agent or a second call agent; and
generate a plurality of stateless requests.

* * * * *